Figure 1:
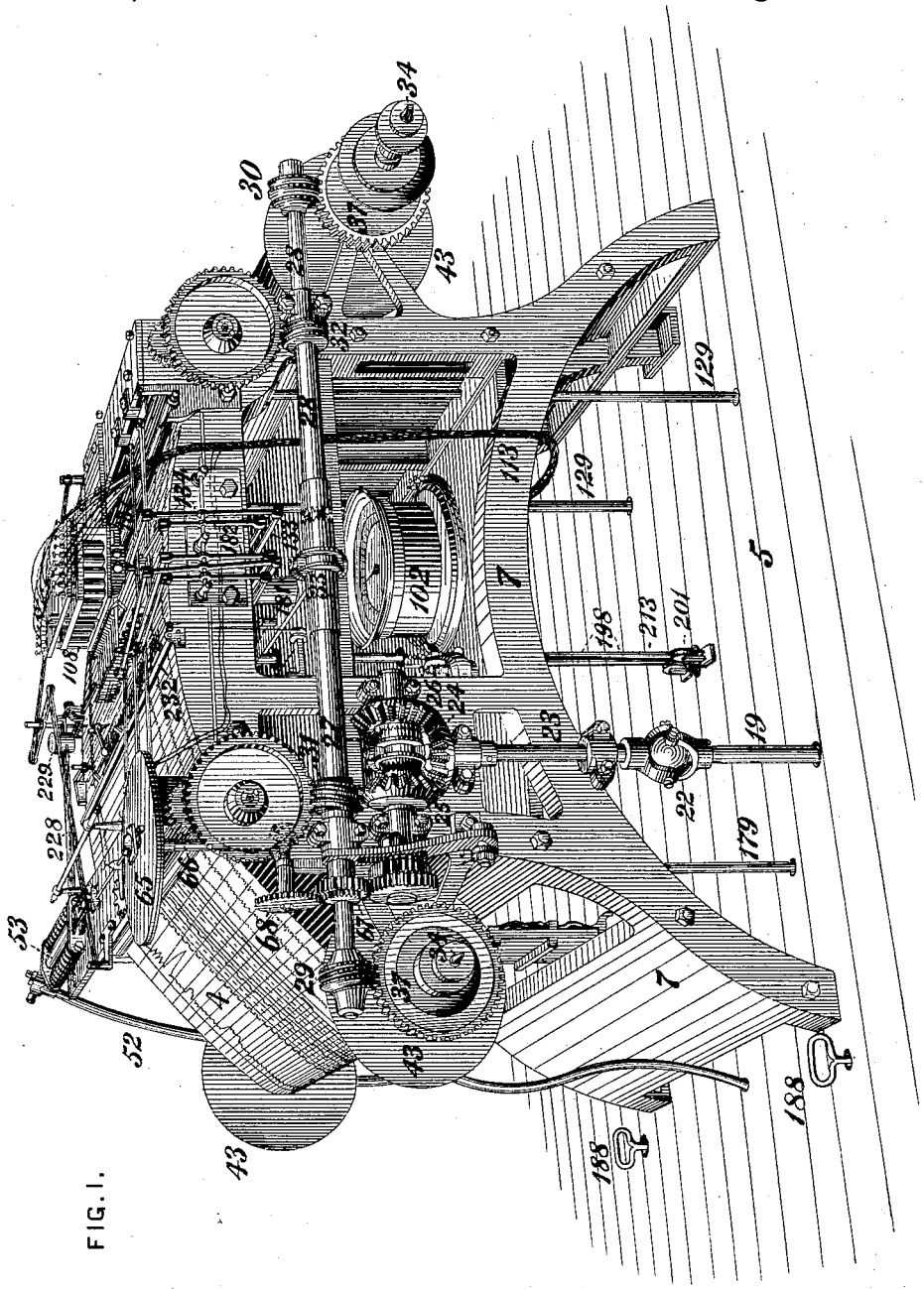

(No Model.)  
19 Sheets—Sheet 1.

P. H. DUDLEY.
MEANS FOR RECORDING THE CONDITIONS OF AND MARKING RAILWAY TRACKS.

No. 367,708.  
Patented Aug. 2, 1887.

WITNESSES:  
Geo. B. Collier  
Geo. T. Kelly

INVENTOR  
P. H. Dudley,  
by Collier & Bell,  
attys.

(No Model.) 19 Sheets—Sheet 2.
P. H. DUDLEY.
MEANS FOR RECORDING THE CONDITIONS OF AND MARKING RAILWAY TRACKS.

No. 367,708. Patented Aug. 2, 1887.

WITNESSES:
Geo. B. Collier
Geo. T. Kelly

INVENTOR
P. H. Dudley,
by Collier & Bell,
Attys.

(No Model.)
19 Sheets—Sheet 3.

P. H. DUDLEY.
MEANS FOR RECORDING THE CONDITIONS OF AND MARKING RAILWAY TRACKS.

No. 367,708.                    Patented Aug. 2, 1887.

(No Model.)
19 Sheets—Sheet 4.

P. H. DUDLEY.
MEANS FOR RECORDING THE CONDITIONS OF AND MARKING RAILWAY TRACKS.

No. 367,708.
Patented Aug. 2, 1887.

WITNESSES:
Geo. B. Collier
Geo. T. Kelly

INVENTOR
P. H. Dudley.
by Collier & Bell
Attys.

N. PETERS, Photo-Lithographer, Washington, D. C.

(No Model.) 19 Sheets—Sheet 5.
P. H. DUDLEY.
MEANS FOR RECORDING THE CONDITIONS OF AND MARKING RAILWAY TRACKS.
No. 367,708. Patented Aug. 2, 1887.
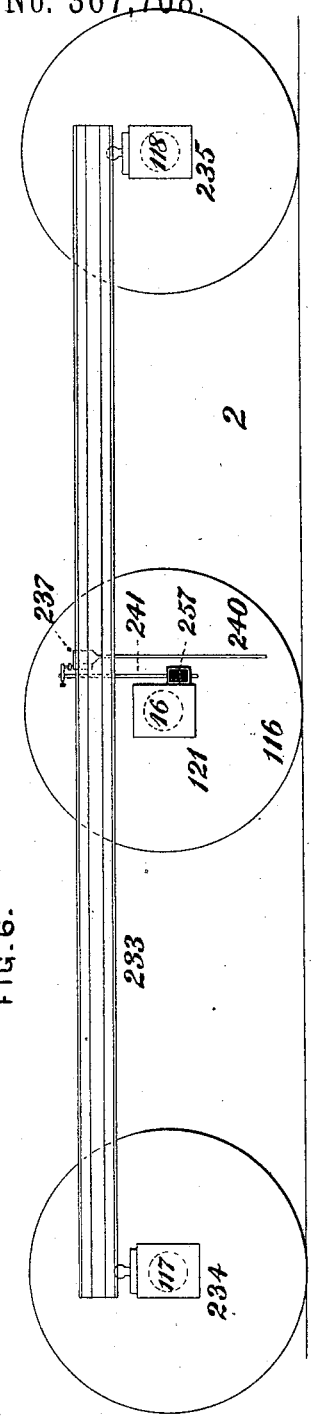
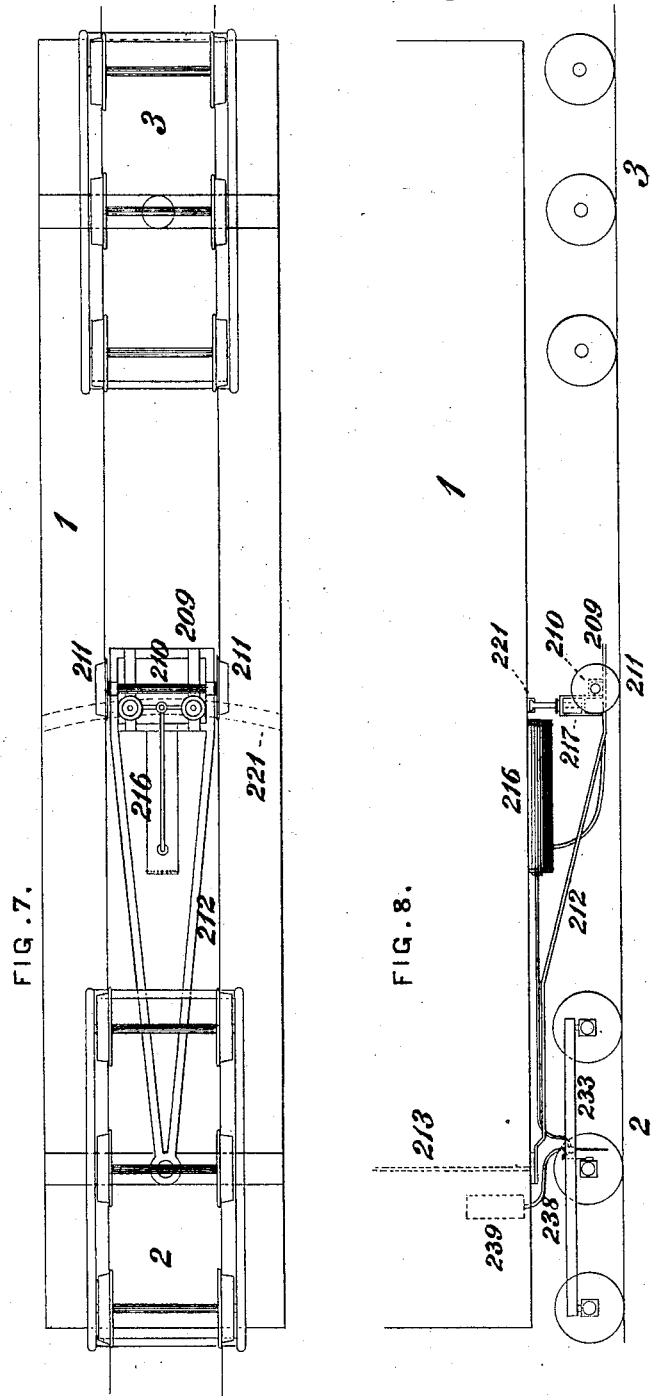
WITNESSES:
Geo. B. Collier
Geo. T. Kelly
INVENTOR
P. H. Dudley,
by Collier & Bell,
attys.

(No Model.) 19 Sheets—Sheet 6.

P. H. DUDLEY.
MEANS FOR RECORDING THE CONDITIONS OF AND MARKING RAILWAY TRACKS.

No. 367,708. Patented Aug. 2, 1887.

WITNESSES.
Geo. B. Collier
Geo. T. Kelly

INVENTOR.
P. H. Dudley,
by Collier & Bell,
attys.

(No Model.)
19 Sheets—Sheet 7.
P. H. DUDLEY.
MEANS FOR RECORDING THE CONDITIONS OF AND MARKING RAILWAY TRACKS.
No. 367,708.  Patented Aug. 2, 1887.
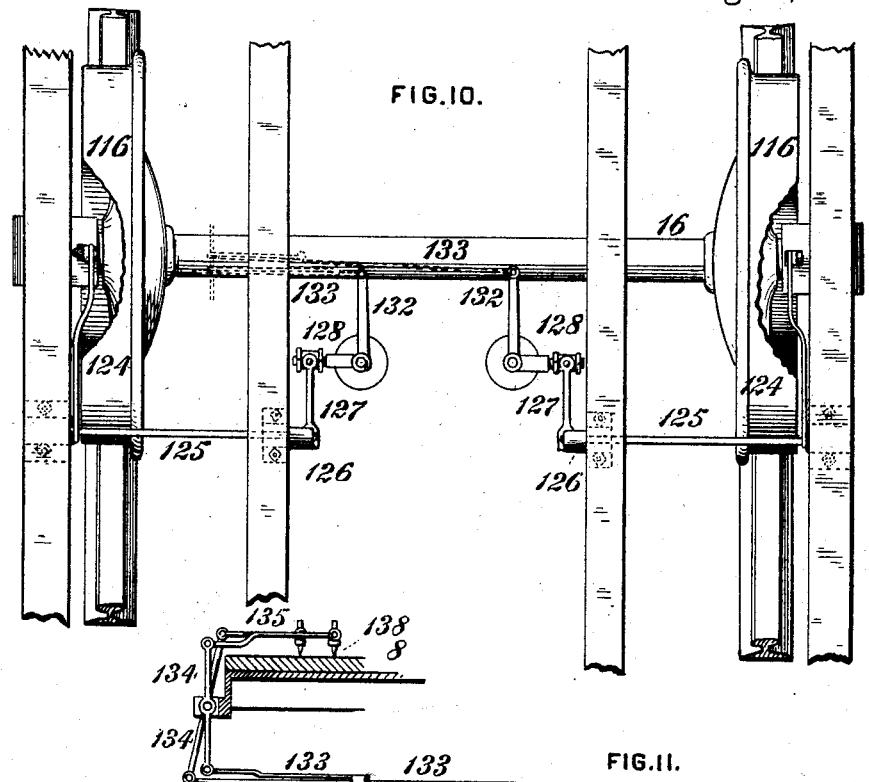
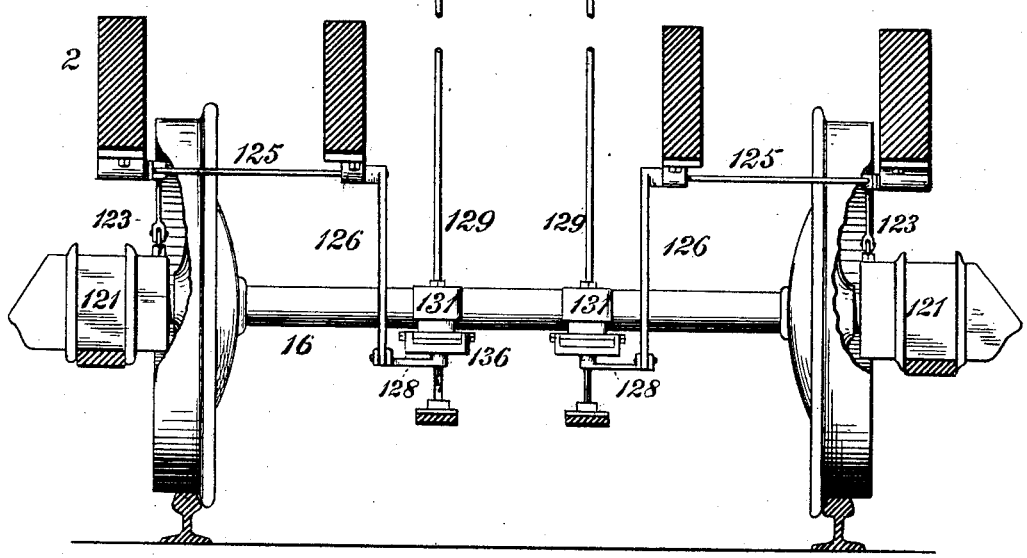
WITNESSES:  
Geo. B. Collier  
Geo. T. Kelly
INVENTOR.  
P. H. Dudley,  
by Collier & Bell  
attys.

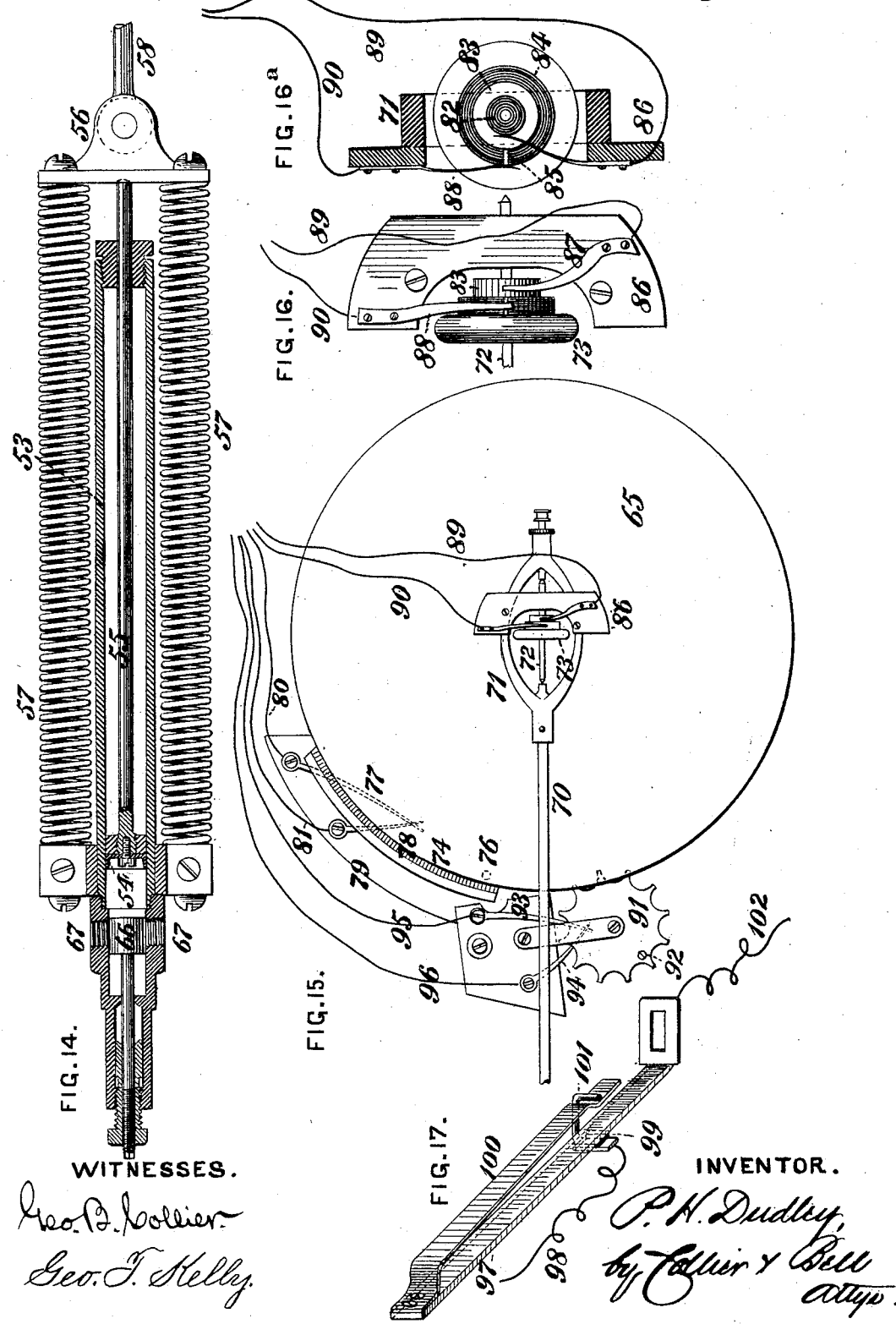

(No Model.)  
19 Sheets—Sheet 9.

P. H. DUDLEY.
MEANS FOR RECORDING THE CONDITIONS OF AND MARKING RAILWAY TRACKS.

No. 367,708.　　　　　　　　　　　　Patented Aug. 2, 1887.

WITNESSES.　　　　　　　　　　　　INVENTOR.
Geo. B. Collier　　　　　　　　　　P. H. Dudley.
Geo. T. Kelly.　　　　　　　　　　by Collier & Bell,
　　　　　　　　　　　　　　　　　　attys.

N. PETERS, Photo-Lithographer, Washington, D. C.

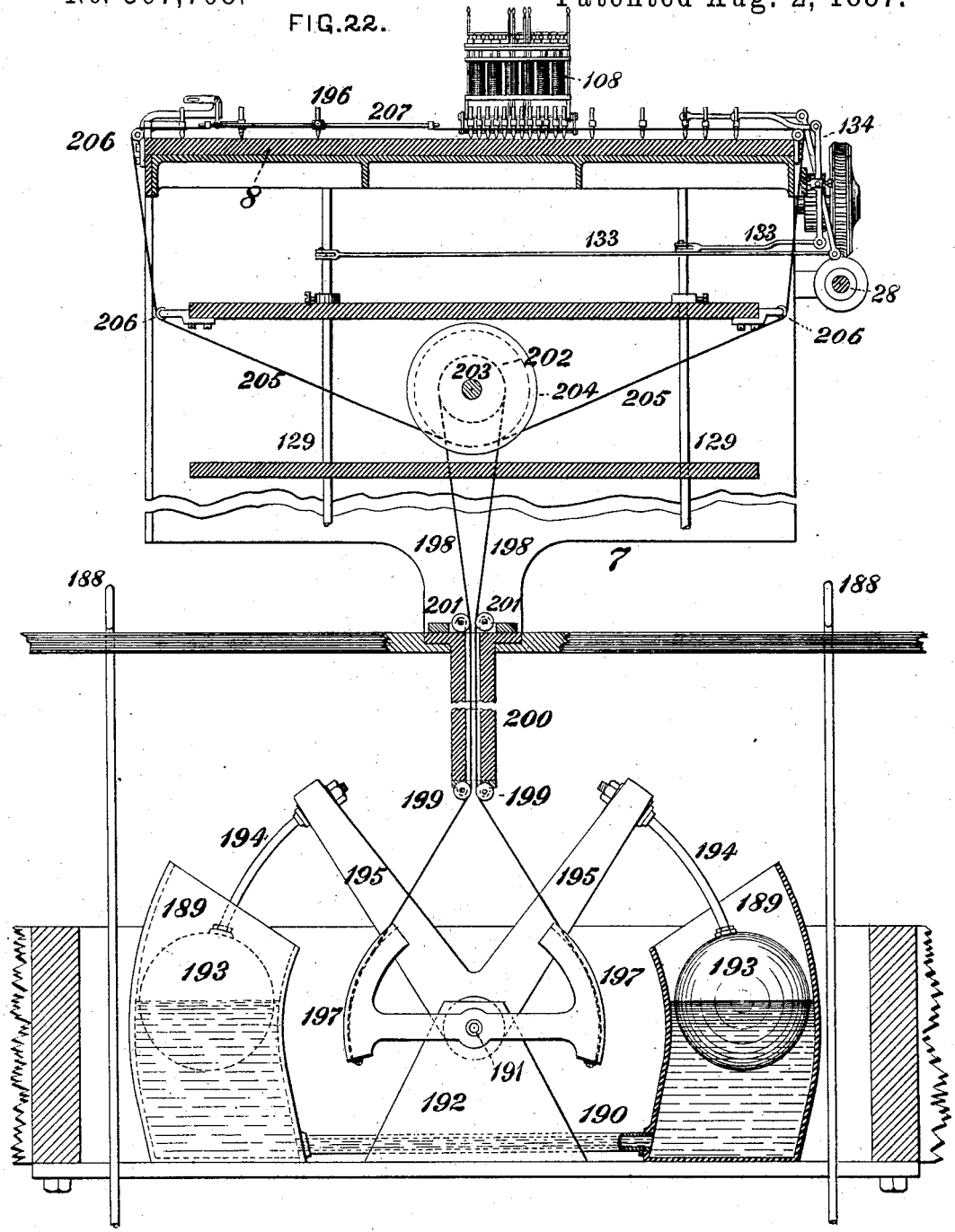

(No Model.) 19 Sheets—Sheet 11.
P. H. DUDLEY.
MEANS FOR RECORDING THE CONDITIONS OF AND MARKING RAILWAY TRACKS.
No. 367,708. Patented Aug. 2, 1887.
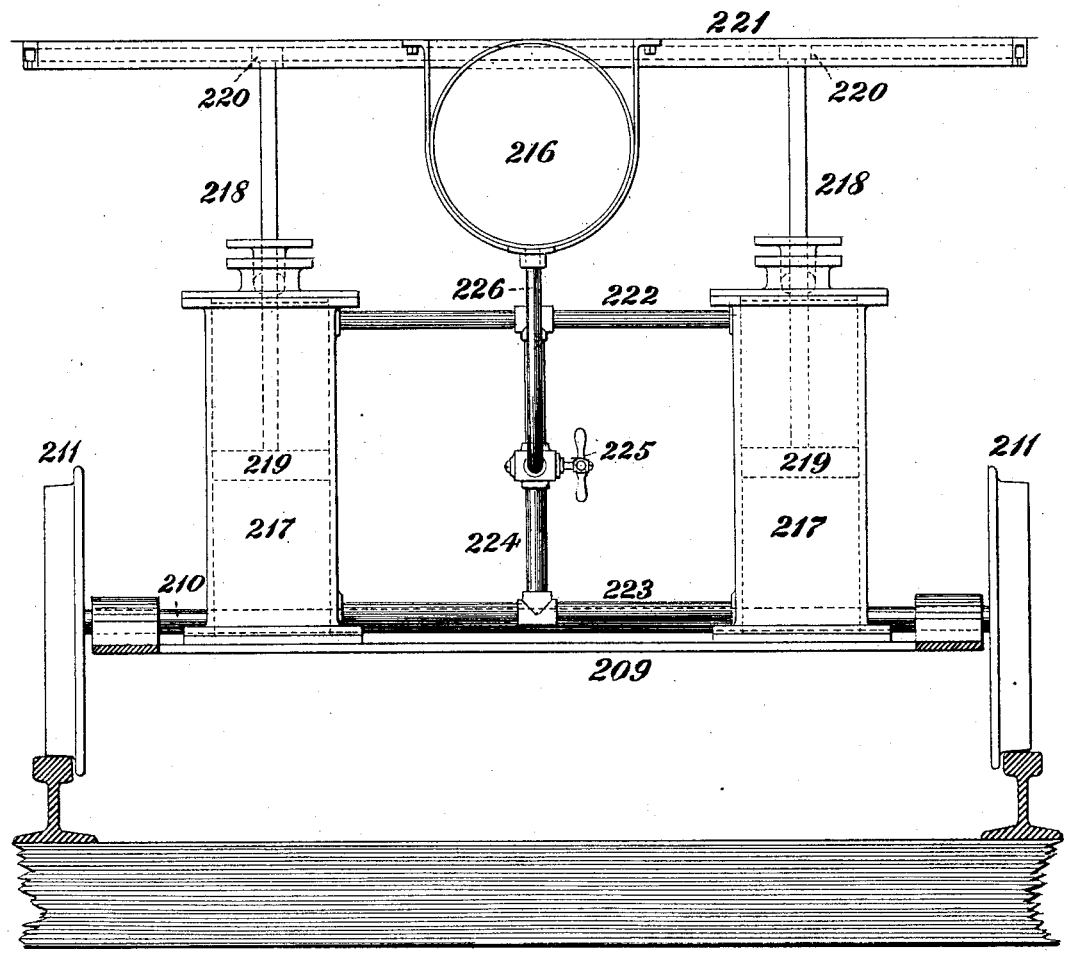
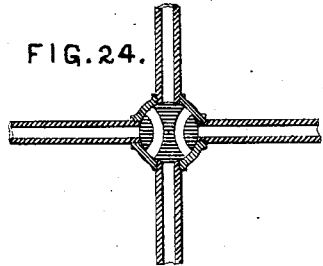
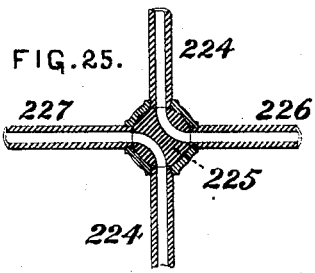
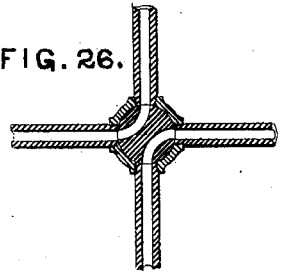
WITNESSES:
Geo. B. Collier
Geo. T. Kelly
INVENTOR
P. H. Dudley,
by Collier & Bell,
Attys.

(No Model.) 19 Sheets—Sheet 12.
P. H. DUDLEY.
MEANS FOR RECORDING THE CONDITIONS OF AND MARKING RAILWAY TRACKS.
No. 367,708. Patented Aug. 2, 1887.
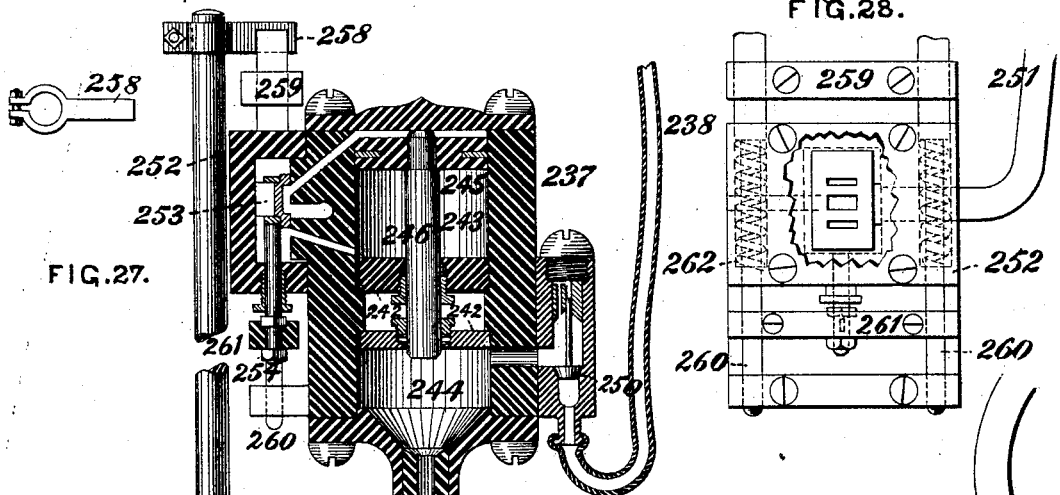
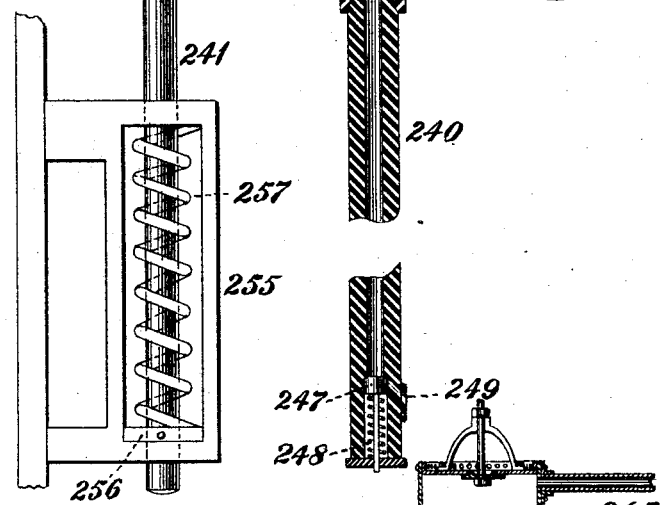
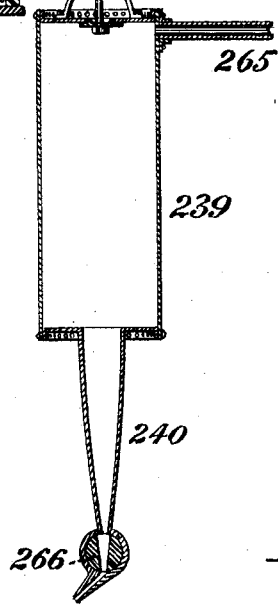
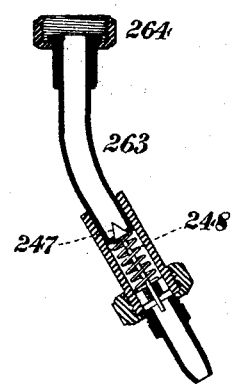
WITNESSES:
Geo. B. Collier
Geo. T. Kelly
INVENTOR
P. H. Dudley
by Coffin & Bell
Attys.

(No Model.) 19 Sheets—Sheet 13.
P. H. DUDLEY.
MEANS FOR RECORDING THE CONDITIONS OF AND MARKING RAILWAY TRACKS.
No. 367,708. Patented Aug. 2, 1887.
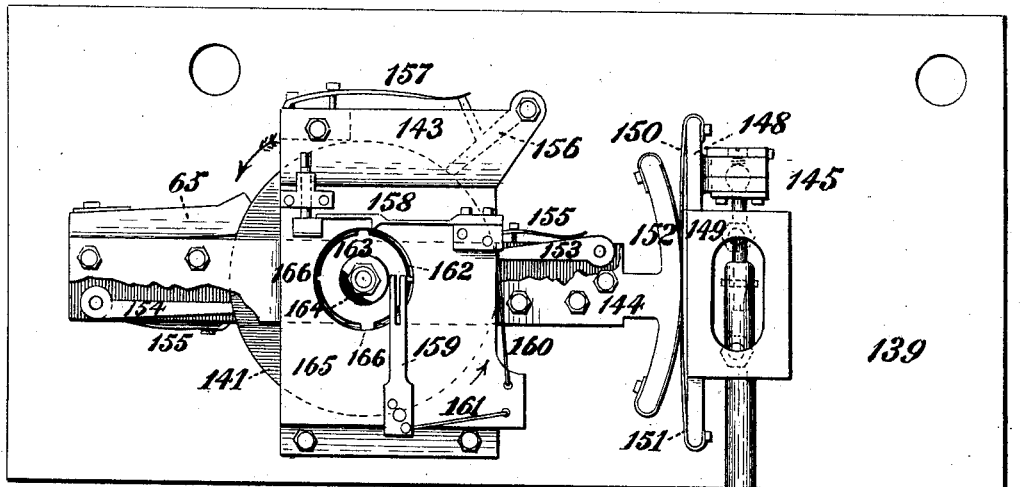
FIG. 32.
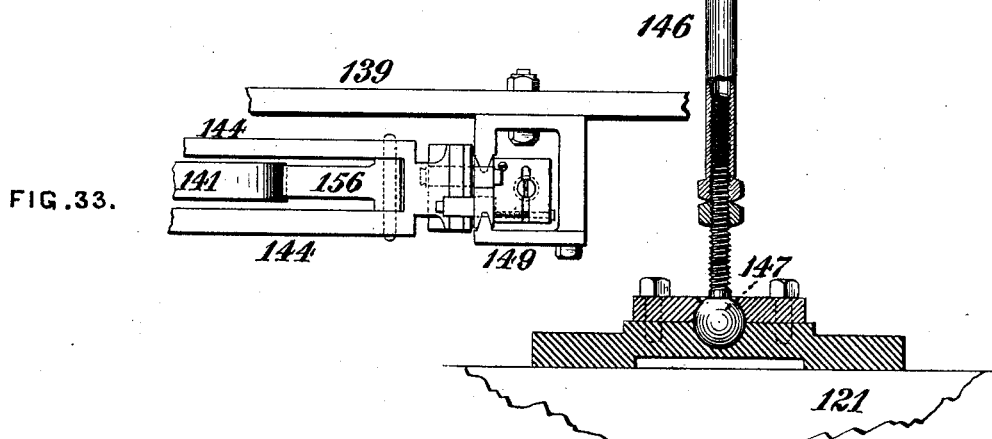
FIG. 33.
FIG. 34.
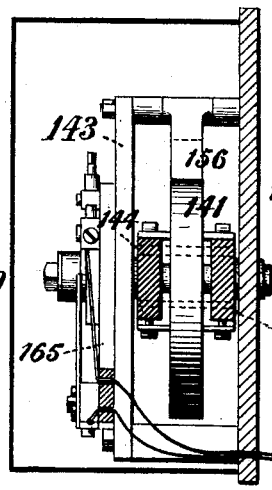
WITNESSES:
Geo. B. Collier
Geo. T. Kelly.
INVENTOR
P. H. Dudley
by Collier & Bell
Attys.

(No Model.)

19 Sheets—Sheet 14.

P. H. DUDLEY.
MEANS FOR RECORDING THE CONDITIONS OF AND MARKING RAILWAY TRACKS.

No. 367,708.                                    Patented Aug. 2, 1887.

WITNESSES:
Geo. B. Collier
Geo. T. Kelly

INVENTOR
P. H. Dudley,
by Collier & Bell,
attys.

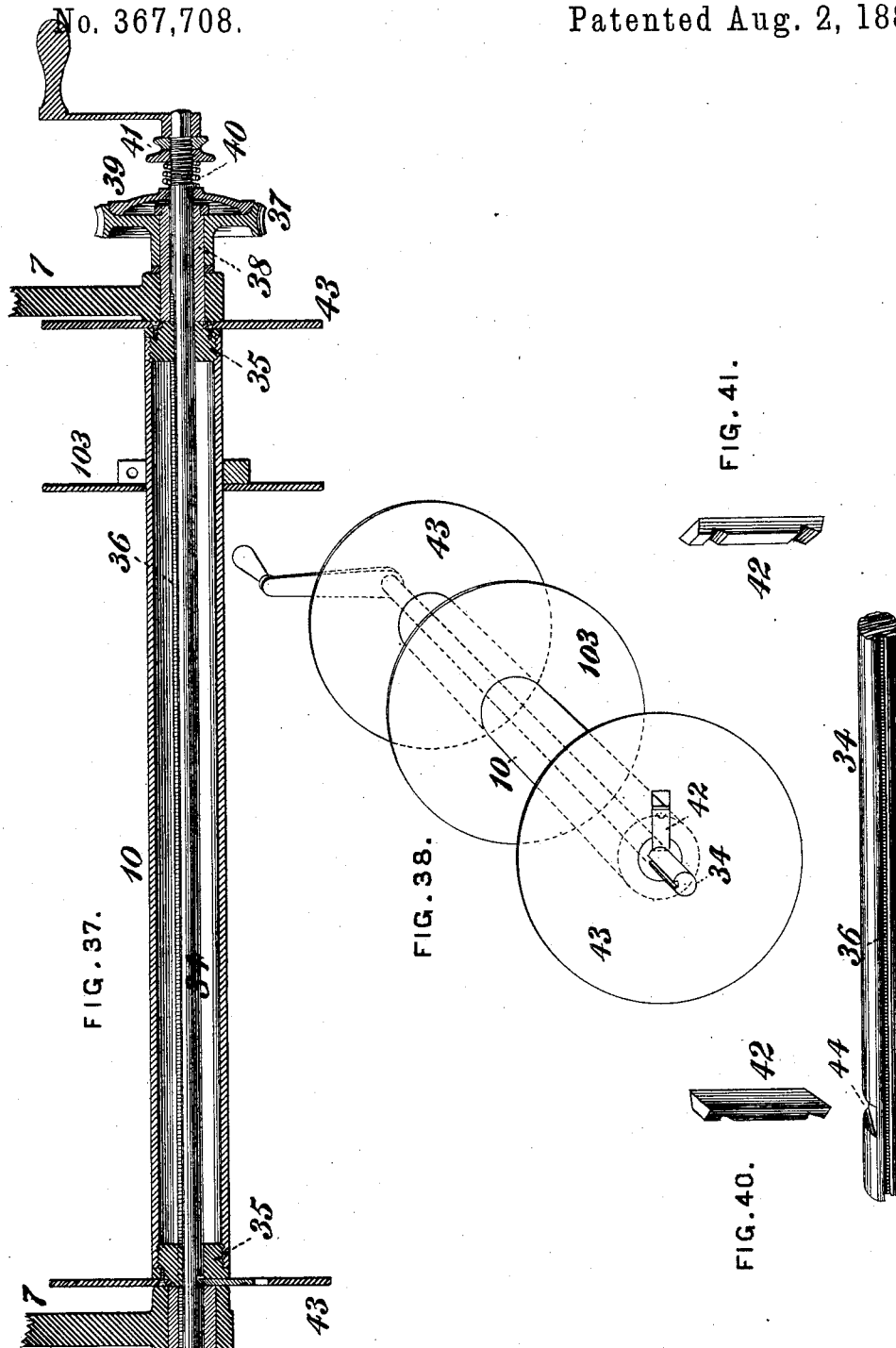

(No Model.) 19 Sheets—Sheet 16.
P. H. DUDLEY.
MEANS FOR RECORDING THE CONDITIONS OF AND MARKING RAILWAY TRACKS.
No. 367,708. Patented Aug. 2, 1887.

WITNESSES.
INVENTOR.

(No Model.)  
19 Sheets—Sheet 17.

P. H. DUDLEY.
MEANS FOR RECORDING THE CONDITIONS OF AND MARKING RAILWAY TRACKS.

No. 367,708. Patented Aug. 2, 1887.

WITNESSES.  
Geo. B. Collier  
Geo. T. Kelly

INVENTOR.  
P. H. Dudley,  
by Collier & Bill, attys.

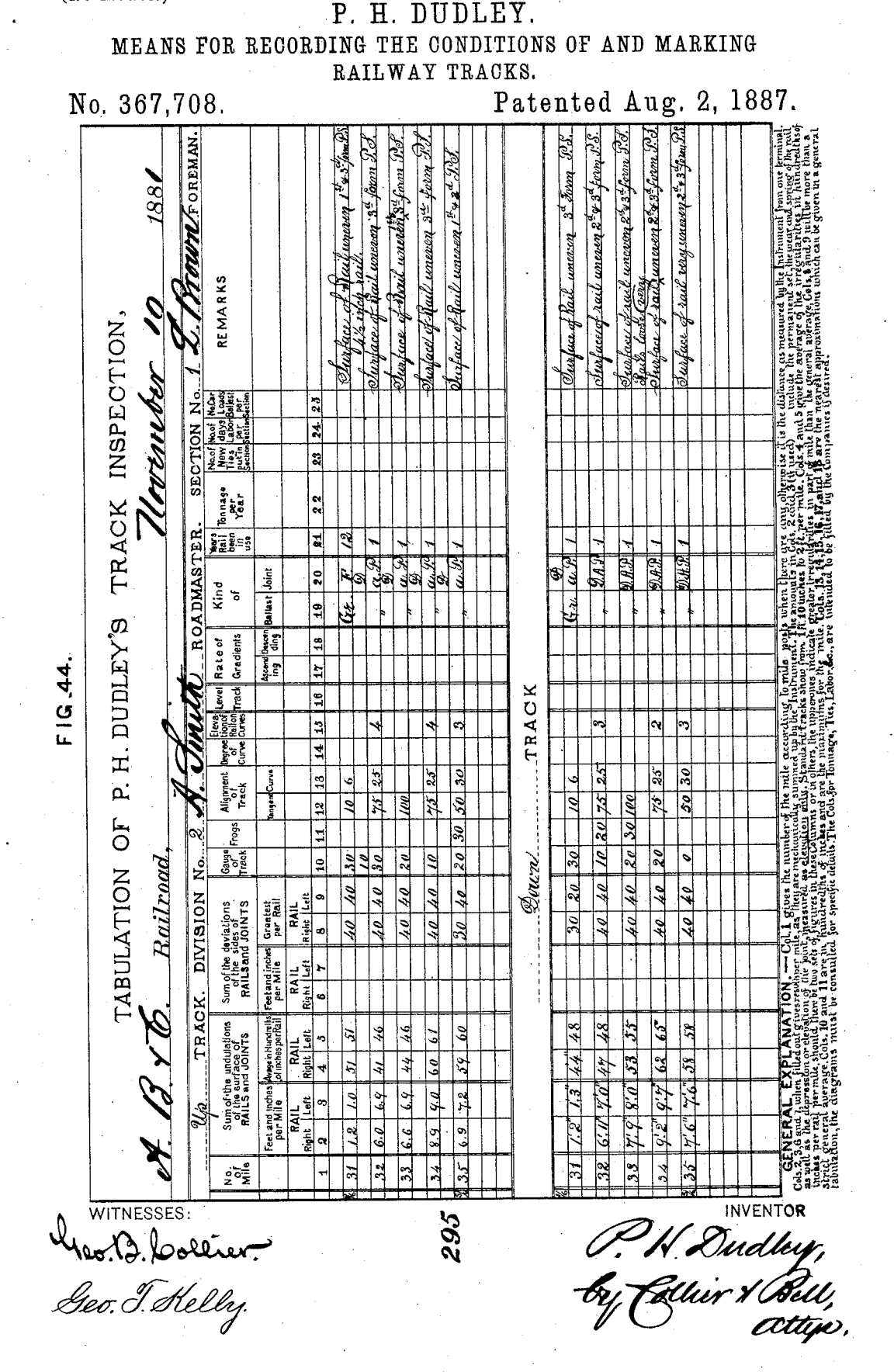

(No Model.)  19 Sheets—Sheet 18.

P. H. DUDLEY.
MEANS FOR RECORDING THE CONDITIONS OF AND MARKING RAILWAY TRACKS.

No. 367,708. Patented Aug. 2, 1887.

FIG. 44.

(No Model.)

P. H. DUDLEY.
MEANS FOR RECORDING THE CONDITIONS OF AND MARKING RAILWAY TRACKS.

No. 367,708.　　　　　　　　　Patented Aug. 2, 1887.

19 Sheets—Sheet 19.

FIG. 45.

WITNESSES.　　　　　　　　　　　　INVENTOR.

UNITED STATES PATENT OFFICE.

PLIMMON H. DUDLEY, OF NEW YORK, N. Y.

MEANS FOR RECORDING THE CONDITIONS OF AND MARKING RAILWAY-TRACKS.

SPECIFICATION forming part of Letters Patent No. 367,708, dated August 2, 1887.

Application filed January 30, 1883. Serial No. 83,481. (No model.)

*To all whom it may concern:*

Be it known that I, PLIMMON H. DUDLEY, of the city, county, and State of New York, have invented certain new and useful Improvements in Means for Recording the Conditions of and Marking Railway-Tracks, of which improvements the following is a specification.

The objects of my invention are, in brief, to ascertain, indicate, and record in permanent form the resistances to traction of railroad rolling-stock of various descriptions, either singly or in trains, the particulars of performance of duty of different descriptions by locomotive-engines, and the condition of railroad-tracks in sundry particulars, which contribute to vary the resistances opposed to traction by cars while being hauled over said tracks; and, further, to indicate upon the rails of said tracks the location and character of defects or irregularities, thereby enabling suitable repairs or corrections to be intelligently made at the proper points.

The invention is designed to produce a graphical record or chart from which may be determined the most advisable and economical constructions of running-gear for use in railroad-cars; the greater or less economy of hauling freight at different speeds; the quantities of fuel and water consumed by locomotive-engines under different conditions of service, and the exact location, character, and extent of defects and irregularities in the track, such data enabling an ascertainment to be made of the cost of power for moving trains, both on the tangents and on the curves of the road, and on either levels or grades, thereby establishing a basis upon which there can be intelligently determined the advisability of expenditure in reducing grades and locating curves for new lines with a given or estimated amount of business, or in the relocation of old lines.

Large expenditures are now being made by railroad companies in straightening curved portions of their roads to avoid the greatly-increased expense of operating such portions, which could have been originally located with less degrees of curvature if the knowledge obtainable by my improvements had been at command prior to their construction.

One feature of my invention is an improvement in investigating the condition of the track-rails of a railway from a moving car, consisting in mechanically locating from the car irregularities or inequalities in the track-rails and mechanically and simultaneously marking from the moving car—as, for example, by applying a marking-fluid upon the rails or other portions of the superstructure—to indicate the locations of such irregularities or inequalities.

The invention also consists in novel combinations of parts, which are hereinafter described, and pointed out in the claims.

The part of my invention which relates to the machine or apparatus includes novel combinations of parts whereby the resistances exerted to traction are measured and recorded upon a band of paper which moves at a speed bearing a fixed relation to the speed of the car, and mechanism for graphically recording on the paper the spaces of time in which the resistances are respectively exerted. These combinations also include bearers moving in contact with the track-rails to ascertain the particulars of character and conditions of track passed over, so that from the chart the effect which such irregularities have upon the resistances exerted to traction may be ascertained at a glance. The novel combinations of parts also include, in connection with supporting-wheels for a railway-vehicle, bearers arranged between the wheels lengthwise of such vehicle and bearing on the track-rails and adapted to rise and fall as they pass defective portions of the track, an apparatus upon the vehicle for ejecting marking-fluid upon the rails or other portions of the superstructure at such defective portions of the track, a valve controlling the ejection of fluid by the apparatus, and connections through which said valve is operated by the rising and falling of the bearers. The novel combinations of parts also include an axle carrying a loose disk which is adapted to bear against the inner face of a line of track-rails, a spring acting to press the disk toward and against the rails, and a recording-pen actuated by a shaft which is coupled to said disk and is vibrated by the longitudinal movements thereof upon its axle, induced by lateral inequalities in the line of rails against which it bears. The novel combinations of parts also include a truck or carriage which is pivoted to the car-body independently of the supporting wheels or trucks thereof, and with the capacity of following curvatures in the track independently of the car-body and its supporting-wheels, a shaft connected to said truck so as to be turned about its center by the lateral movement thereof, and a recording-pen connected with and actuated by said shaft so as to indicate the character and extent of movements thereof. The novel combinations of parts also include the mechanism whereby a web or band of paper is driven or moved at a speed bearing a fixed relation to the speed of the car. The machine or apparatus also includes or comprises other novel combinations of parts, particularly hereinafter described, and pointed out in the claims.

The invention further consists in a graphical diagram or chart for the investigation of railroad operations, in which are combined a mechanically-formed graphical indication of the resistances to traction exerted in the traverse over any required length of road, and similarly-formed graphical indications of the divided periods of time within which such resistances are respectively exerted, and one or more similarly-formed graphical indications illustrating the condition and character of track passed over, which tends to modify or affect the degree of resistance to traction, all of said indications being formed upon a determined scale and in fixed mutual relation at all points in their length.

Figure 2:
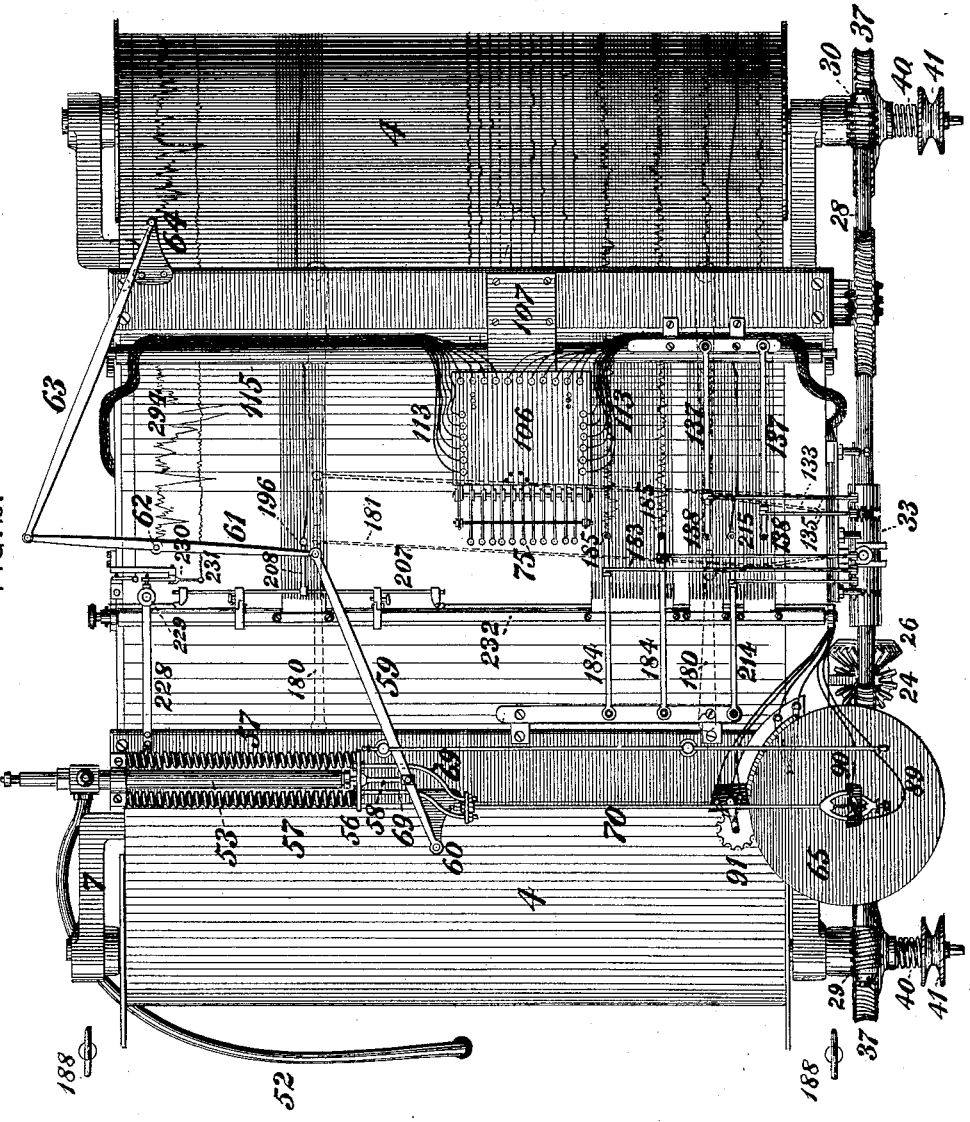
Figure 3:
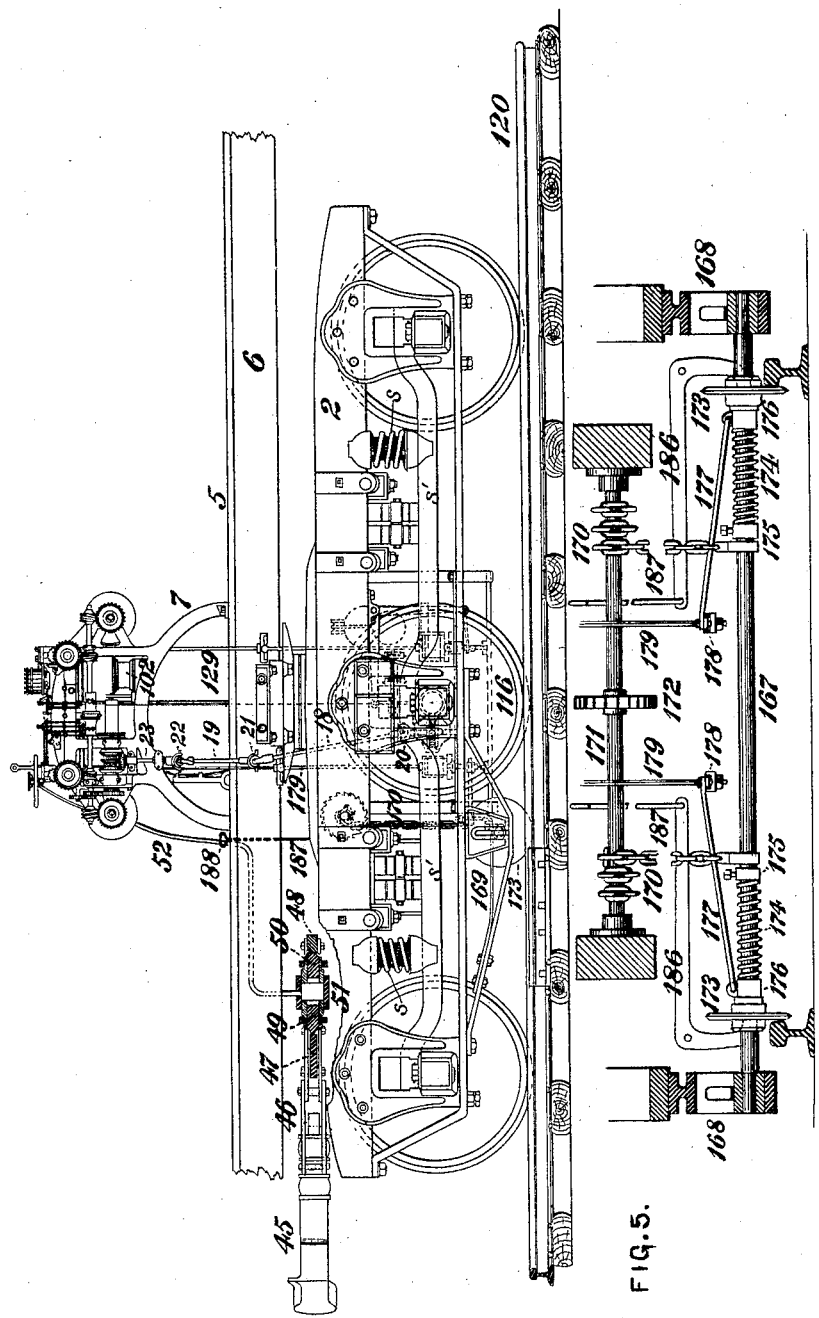
Figure 4:
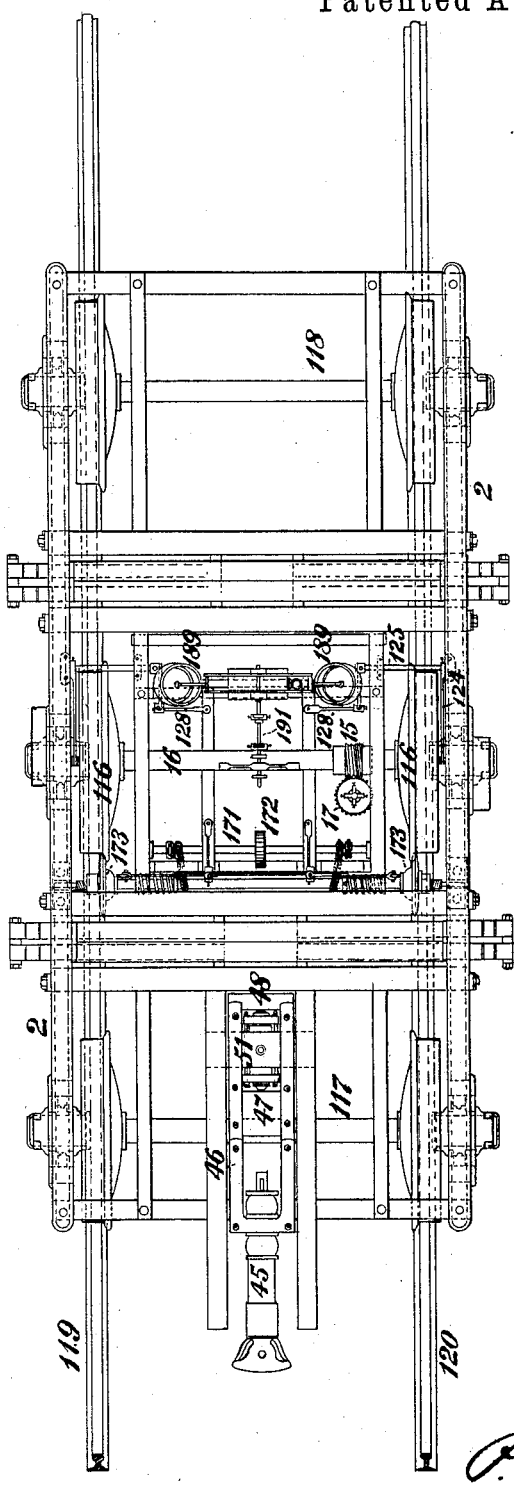
Figure 13:
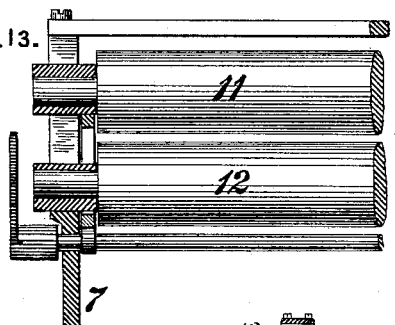
Figure 12:
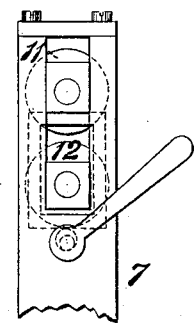
Figure 9:
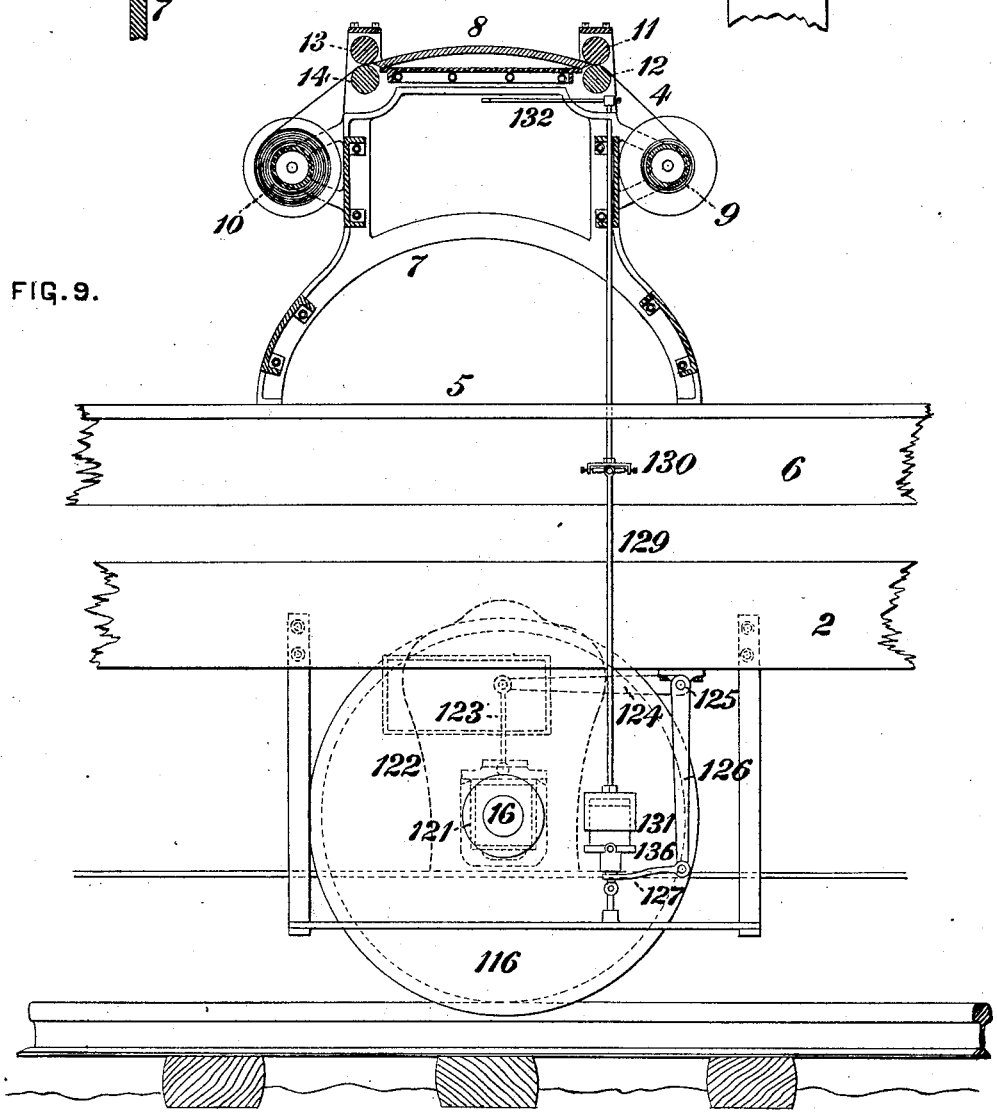
Figure 18:
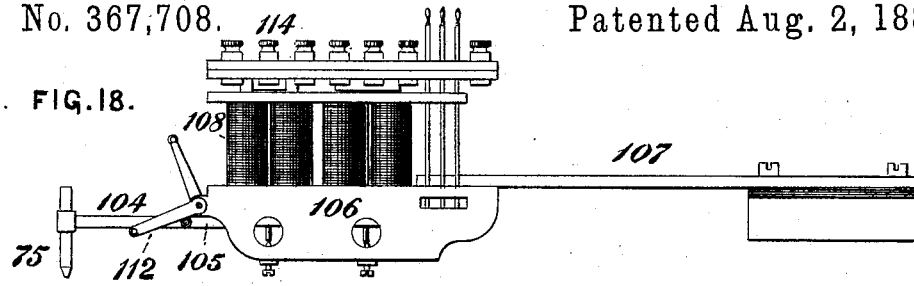
Figure 19:
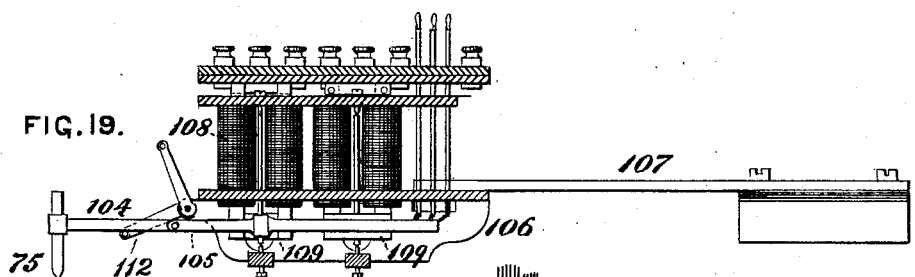
Figure 20:
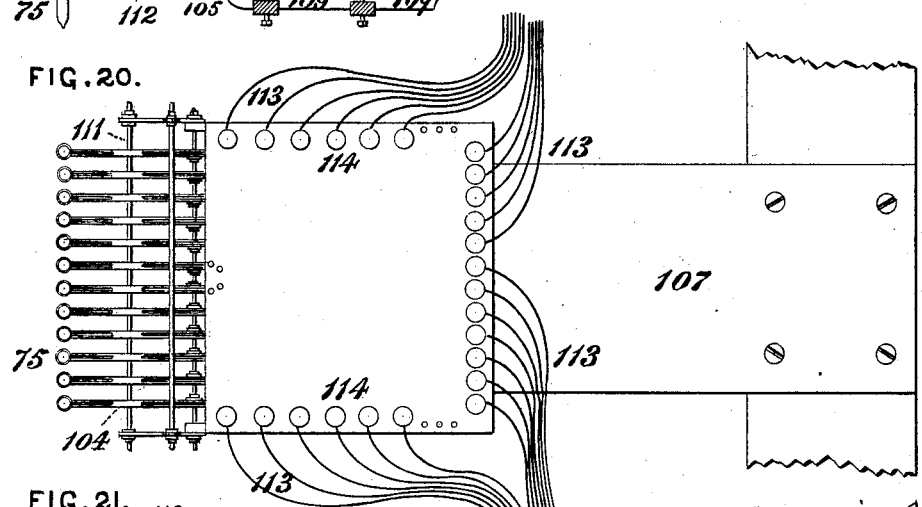
Figure 21:
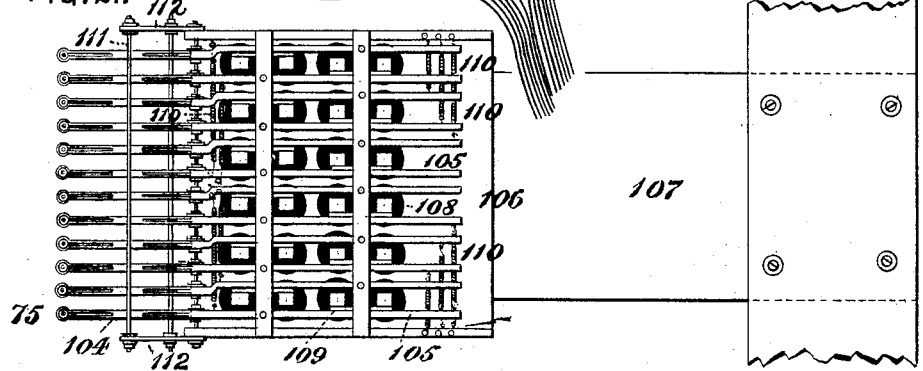
Figure 35:
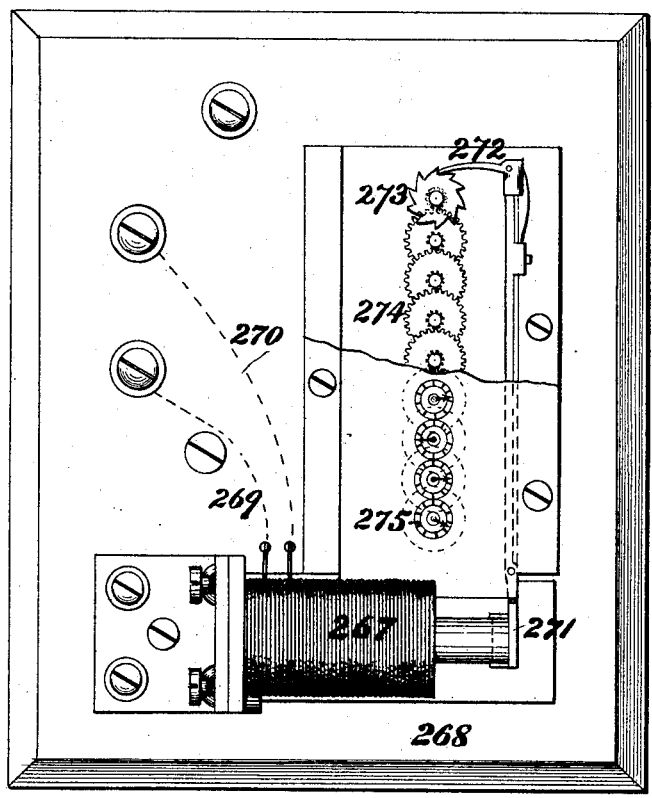
Figure 36:
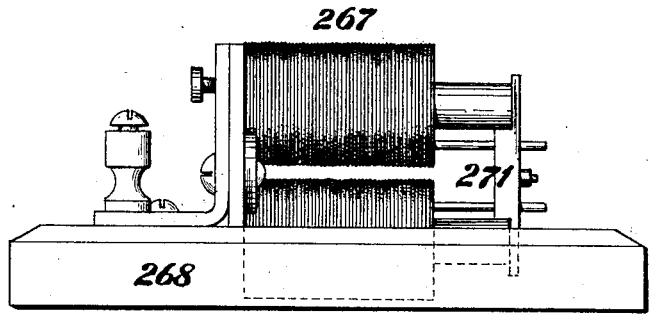
Figure 42:
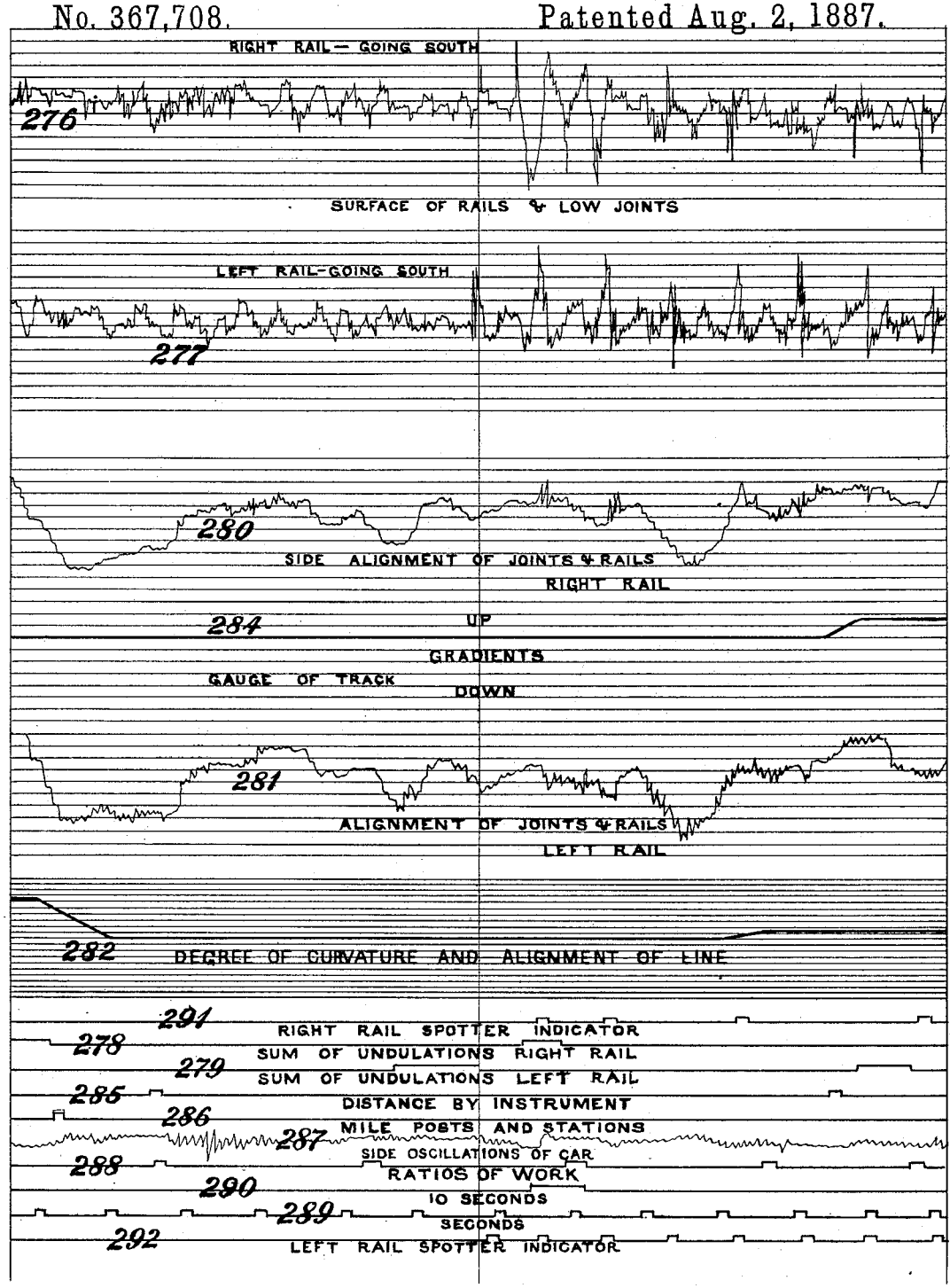
Figure 43:
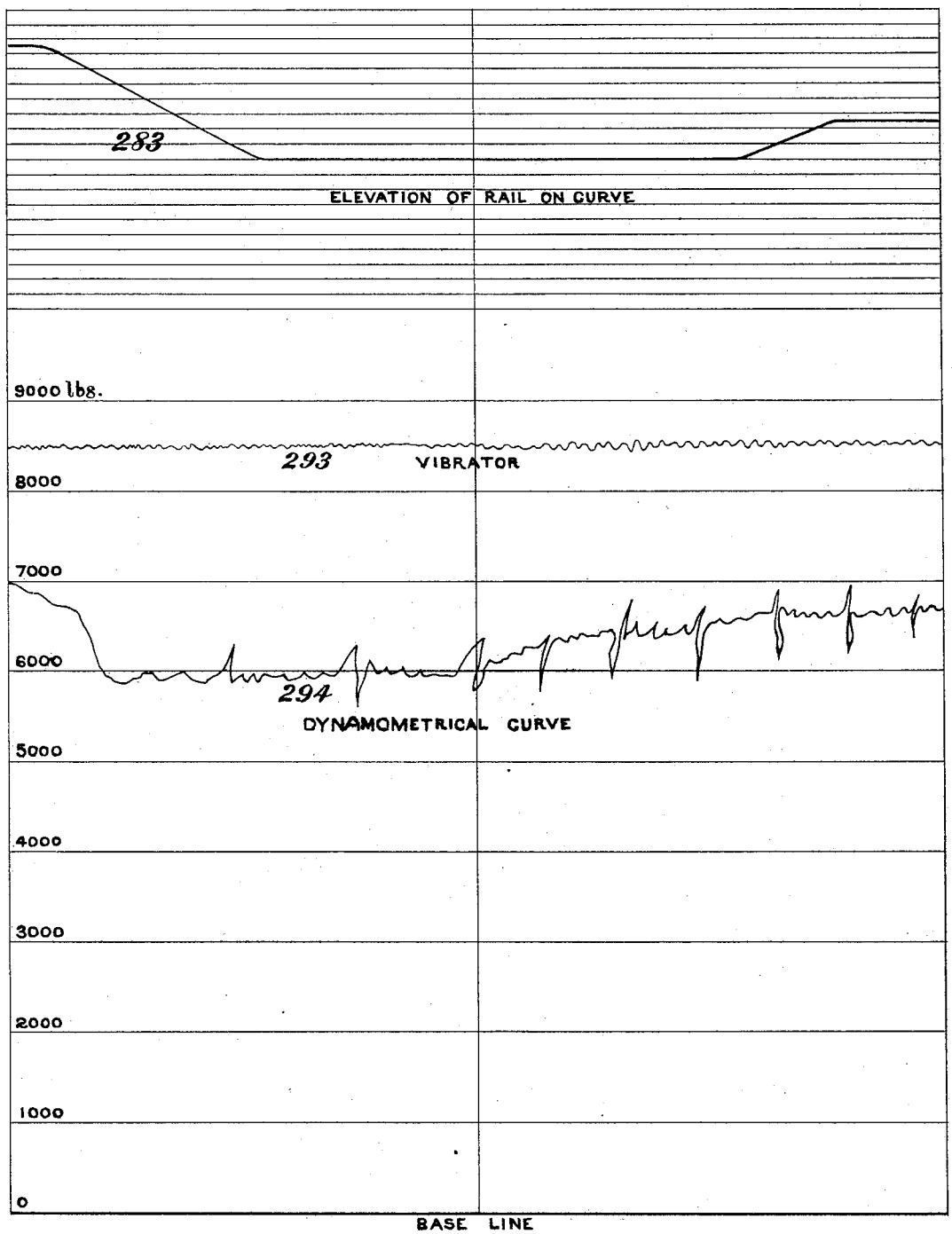

In the accompanying drawings, Figure 1 is a view in perspective of a recording apparatus embodying and adapted to the practice of my invention; Fig. 2, a plan or top view of the same; Fig. 3, a side view in elevation of the same, illustrating its relation to the sills and truck of a railroad-car; Fig. 4, a plan or top view of a car-truck with my improvements applied; Fig. 5, a view in elevation of the mechanism for ascertaining lateral inequalities in railroad-tracks; Fig. 6, a side elevation diagram showing the application to a car-truck of mechanism for marking upon the track-rails the location of vertical inequalities; Fig. 7, an inverted plan; and Fig. 8 a side elevation diagram of a railroad-car, illustrating mechanism for determining radii of curves and for marking vertical inequalities; Fig. 9, a side view, partly in elevation and partly in section, illustrating the relation of a recording apparatus and mechanism for determining vertical inequalities of the track-rails; Fig. 10, a plan or top view, and Fig. 11 a side view, as seen transversely to the car, of mechanism for determining vertical inequalities of the track-rails; Figs. 12 and 13, end and side views, respectively, showing the arrangement of the rolls for feeding the band of paper upon which the records are made; Fig. 14, a longitudinal section through the smaller oil-cylinder of the mechanism for ascertaining resistances of traction; Fig. 15, a plan or top view of the integrating apparatus, distance-measurer, and mile-post indicator; Fig. 16, a similar view, on an enlarged scale, of the electrical connections for the integrating attachment; Fig. 16ª, a transverse section through the same; Fig. 17, a view in perspective of an apparatus for ascertaining the number of revolutions made by a locomotive-engine; Fig. 18, a side view in elevation of the electro-magnetic recording mechanism; Fig. 19, a vertical central section, Fig. 20 a plan or top view, and Fig. 21 a bottom view of the same; Fig. 22, a vertical section illustrating the relation of the recording mechanism and mechanism for determining the elevation of the outer rails upon curves or ascertaining gradients; Fig. 23, a view in elevation, as seen transversely to the car, of the raising and lowering device of the mechanism for determining the radii of curves; Figs. 24, 25, and 26, sections showing the four-way cock of said device in different positions; Fig. 27, a longitudinal central section through the working-cylinder of the apparatus for marking vertical inequalities of the track; Fig. 28, a side view in elevation, and Fig. 29 a plan or top view of the same; Fig. 30, a section through a discharge valve and nozzle adapted to the same; Fig. 31, a central section through a modification of the marking apparatus; Fig. 32, a side view in elevation of the summing-up mechanism; Fig. 33, a plan or top view, and Fig. 34 an end view of the same; Fig. 35, a plan or top view of an electro-magnetic counter; Fig. 36, an end view of the same; Fig. 37, a longitudinal section through one of the paper-carrying drums; Fig. 38, a view in perspective of the same; Fig. 39, a similar view, on an enlarged scale, of a portion of the shaft of said drum; Figs. 40 and 41, similar views of the key for locking said drum to its shaft; Figs. 42 and 43, views of the upper and the lower portions, respectively, of an original graphical record or chart of data as produced by my invention; Fig. 44, a view of a tabulation-blank filled out with a record of data ascertained by my invention, and Fig. 45 a condensed graphical diagram as deduced from the data originally mechanically recorded.

Prior to my invention, so far as my knowledge and information extends, the determination of tractive resistances upon railroads has been limited to an observation, as far as was practicable, of the recorded indications of a dynamometer interposed between the motive power and the load upon which its effort was exerted, but without ascertaining or indicating the instants of time at which changes in the dynamometrical record had taken place.

It will be obvious to those skilled in the management and operation of railroads that a simple indication of the tension exerted upon a draw-bar is wholly insufficient to determine with any degree of practical accuracy and value the resistance offered under given conditions or the variations thereof induced by the character and extent of modifying circumstances which constantly present themselves, such as alterations of speed, either accidental or intentional, changes in the profile and alignment of the track, and imperfections and irregularities, greater or less, in the road-bed and superstructure. The dynamometrical curve indicates only the power which is momentarily exerted by the locomotive engine, without evidencing the effect due to the momentum of the moving mass, as stored up or given out in acceleration or retardation of its speed. In the movement of trains power is required for two distinct purposes—first, to overcome the inertia of the entire load, and, second, to maintain the movement of the load as against the various elements of resistance. The ascertainment, to be a complete and intelligent one, must combine with the indication and record of resistances, as momentarily existing, a simultaneous determination and record of the sundry conditions by which said resistances tend to be increased or diminished, and such mode of operation, which is practiced under my invention, has not been prior thereto, so far as I am aware, known or attempted, nor do I know of any prior mechanical structure or device by which the conditions of location as to grades and curves and state of perfection as to vertical and horizontal irregularities and inequalities of a railroad-track can be measured and correspondingly graphically recorded.

In the practice of my invention the sundry mechanical members employed are by preference located within and upon a railroad car constructed with special reference to their accommodation, that which I have heretofore employed being of the general form and dimensions of an ordinary passenger-car supported upon two trucks, and said mechanism will be so herein described and shown. Some or all of the apparatus can, however, be placed upon a locomotive-engine, and I contemplate its application in such relation, with a view to the perfectionment of the results attained by enabling the operation of the motive power to be under the observation and control of the operator, and by dispensing with intermediate connections between the same and the supporting-vehicle of the measuring and recording apparatus.

By the employment of proper mechanism, hereinafter to be described, I ascertain and measure the momentarily varying tractive resistances to the exertion of motive power upon the draw-bar as existing within given instants or periods of time, and the conditions, so far as attainable, which tend to the variations of said resistances, and simultaneously form a graphical record of the several data in fixed relation one to the other. While, as will be obvious, the accurate ascertainment of tractive resistance involves a corresponding ascertainment of the character and condition of the track over which the load is drawn, the equally important duty of performing what may be termed a "mechanical track inspection" has no necessary dependence upon the investigation of traction, and such two separate functions of my invention are fulfilled either simultaneously or coincidently, according as necessity or convenience may dictate.

To the end of affording those skilled in the art of operating railroads the information necessary to the practice of my invention, I shall proceed to describe the methods I employ and the construction and mode of operation of the sundry mechanical structures and devices by which they may be carried out, premising that I do not confine myself in all particulars to the specific mechanism hereinafter described, as various modifications in its details may be made without departing from the spirit of my invention. The description relates to the instance in which the investigation of traction and track inspection are performed simultaneously.

The railroad-car 1, which in this instance serves as the supporting-vehicle of the mechanism, is carried upon trucks 2 3, one adjacent to each end, as usual. The recording apparatus, Figs. 1, 2, 3, 9, and 22, which embodies the necessary facilities for the reception and longitudinal movement of a web or band of paper, 4, on which the several graphical records are formed, and the actuation at proper intervals of the several recording-pens, is secured to the floor 5 and sills 6 of the car above the truck 2. A vertical frame, 7, having a curved table, 8, upon its top, provides bearings for two drums, 9 10, upon which the web of paper, 4, is wound, being fed continuously from one drum to the other during operation by one or the other of two pairs of feed-rolls, 11 12 and 13 14, located, respectively, at opposite ends of the table. The web of paper is traversed in either direction, as may be desired, the driving mechanism being adapted to rotate either pair of feed-rolls to move the paper and drum adjacent to that pair of rolls for taking up the fed paper, the paper being moved at a rate of speed regulated proportionately to that of the car. To this end a worm, 15, upon the central axle, 16, of the truck 2, engages a worm-wheel, 17, upon a short vertical shaft which is connected by intermediate shafts, 18 19, and universal joints 20 21 22, with a shaft, 23, mounted in bearings on one side of the frame 7 and carrying a bevel-gear, 24, meshing with corresponding gears, 25 26, fitting loosely upon a short horizontal shaft on the frame 7. A feathered clutch, 27, on the shaft of the gears 25 26 may be shifted so as to engage either of said gears or to be free from both, so that the shaft of the gears 25 26 may be rotated in one or the other direction, or remain stationary, as desired.

The paper-drums 9 and 10 and either of the two pairs of feed-rolls 11 12 or 13 14 are driven by a horizontal shaft, 28, carrying four worms, 29 30 31 32, those adjacent to the ends, 29 30, being fixed upon the shaft and having their threads leading in opposite directions, and the intermediate pair, 31 32, which have threads of opposite lead, respectively, being secured to sleeves which are loose on the shaft. A feathered clutch, 33, on the shaft 28 admits of the engagement of either of the worms 31 or 32 therewith. Motion is imparted to the shaft 28 from the shaft of the gears 25 26 by intermediate gearing, a spur-gear on said shaft meshing with a pinion rotating upon a stud fixed to the frame adjacent to said shaft. A spur-gear which rotates with said pinion meshes with a pinion on the shaft 28, and the intermediate gears and pinions, which are shown (but not figured) in Fig. 1, may be changed relatively, so as to vary the speed of the worm-shaft 28, and consequently of the web of paper, 4, as may be required. The paper-drums 9 10 are connected to their shafts 34 in such manner as to admit of a regulated tension being maintained upon the web of paper, 4, so as to keep the same taut and prevent wrinkles or irregularities in its surface, and, further, to admit of the ready insertion and removal of the paper whenever desired, and in operation, as will be seen from the arrangement of the driving-gearing, the worm-wheels for driving the two paper-drums are rotated in opposite directions, and the pair of feed-rolls adjacent to the receiving-drum—that is, the drum upon which the paper is wound after the record has been marked upon it—is alone rotated, the other pair remaining stationary, and, by the elevation of the upper roller, permitting the paper to pass freely between them. Each of the drums 9 10 is screwed at its ends onto hubs or bosses 35, each having a central opening through which the shaft 34 passes freely longitudinally, axial movement of the hubs upon the shaft being prevented by internal feathers in their central openings, said feathers entering longitudinal grooves or splines 36 in the drum-shafts 34.

Worm-wheels 37 are fitted to rotate freely upon the bushings 38, each forming one of the end bearings of one of the drum-shafts 34, said worm-wheels meshing with the worms 29 30 of the shaft 28, and the rotation of the worm-wheels is imparted to the drum-shafts 34 through friction-clutch disks 39, which are splined to fit upon longitudinal feathers on the shafts and are pressed up to the worm-wheels 37 by springs 40, which are tightened by nuts 41 engaging screw-threads on the shafts. Any required degree of tension may thus be imparted to the paper by correspondingly adjusting the tension of the springs 40 upon the friction-clutches 39, and to prevent the drum-shafts from being withdrawn longitudinally from the drums 9 and 10 by the pressure of the springs 40 a key or dovetail-ended block, 42, is inserted in a radial opening formed in one of the disks or heads 43, which are connected to the hubs 35 to hold the paper in position endwise upon the drums, said keys entering corresponding recesses, 44, in the drum-shafts 34. By slackening the springs 40 the keys 42 may be readily withdrawn, admitting of the corresponding withdrawal of the shafts 34 from the drums and the removal of either of the heads 43 to insert or remove rolls of paper. Heads 103, which are adjustable longitudinally upon the drums 9 10, are provided to suit webs of paper of different widths, as may be required by the greater or less number of data which are to be ascertained and recorded at a single operation.

The movement of the paper at proper speed is not effected by the drums 9 and 10, but by one or the other pair of feed-rolls. In moving the paper in either direction it is wound up on one drum, 9, for example, and the drum 10 is turned by the draft on the paper in one direction, while the worm-wheel 37 is turned positively in a reverse direction. In this way the paper is always kept taut and the variations in surface speed of the rolls of paper on the drums do not affect the speed of travel produced by the feed-rolls.

The apparatus for ascertaining and recording the dynamometrical curve of the strains of tension or compression upon the draw-bar induced by the tractive resistance of a given load is shown in Figs. 1 to 4, inclusive, and Fig. 14. The draw-bar 45 of the car is connected to a frame, 46, fitted to slide longitudinally between the draw-bar timbers of the car, and having transverse pieces 47 48, which abut respectively against the outwardly-projecting ends of pistons or plungers 49 50, fitting in a horizontal oil-cylinder, 51, the oil contained between the pistons of which is subject to the pressure due to the strains upon the draw-bar as exerted upon one or the other of the pistons 49 50, according to the direction in which the car may be moving. The cylinder 51 is connected by a pipe, 52, with a smaller cylinder, 53, secured to the frame 7 above the table 8. The piston 54 of the cylinder 53 is secured upon a rod, 55, the outer end of which bears against a cross-head, 56, connected by springs 57 to the frame, the action of said springs being exerted in reverse direction to that of the pressure of the oil upon the piston 54, which, together with the cross-head 56, is thus moved in one or the other direction coincidently with and correspondingly to variations of pressure in the oil-cylinders 51 and 53. The cross-head 56 is coupled by a link, 58, to a lever, 59, at a point between the fulcrum 60 of said lever, which is fixed to the frame of the machine, and its free end, which is coupled to a lever, 61. The lever 61 carries at about the middle of its length a recording-pen, 62, and at its opposite end is coupled to one end of a lever, 63, the opposite end of which is fulcrumed to the frame at 64. The levers 59, 61, and 63 act as a parallel motion, governing the movements of the pen 62, by which the dynamometrical curve 294 is drawn upon the web of paper. A valve, 66, governing the inlets 67 in the cylinder 53, to either one of which the oil-pipe 52 may be connected, admits of regulating the supply, as may be desirable, to prevent too sudden and violent oscillations of the piston and its connections.

The integrating mechanism, Figs. 1, 2, 15, 16, and 16ª, is that which mechanically ascertains and registers the area of the figure bounded by the dynamometrical curve, its base or datum line, and the ordinates which are the boundaries of the distance within which the resistance is exerted. Such area represents the value in foot-pounds of the power of the locomotive-engine exerted in overcoming the resistance to traction in such distance, and the object and function of said mechanism are to economize the time and labor which would otherwise be involved in arriving at the value of the dynamometrical curve by calculation.

A disk, 65, is secured to a vertical shaft, 66, mounted in bearings on the frame 7, said disk being, as nearly as may be practicable, in line, both horizontally and longitudinally, with the piston-rod 55 of the cylinder 53. Rotation is imparted to the shaft 66 and disk 65 from the worm-wheel shaft 28, a spur-pinion, 67, on the shaft 28 engaging a similar gear, 68, on a horizontal shaft which carries a worm engaging a worm-wheel on the shaft 66, the speed of which will consequently be in direct proportion to that of the car. The cross-head 56 of the oil-cylinder 53 is connected by links 69 with a rod, 70, to the opposite end of which is secured a frame, 71, within which are formed bearings for a horizontal shaft, 72, on which is fixed a roller, 73. The length of the links 69 and rod 70 is such that when no resistance is being exerted upon the draw-bar and no resultant pressure upon the piston of the cylinder 53 the periphery of the roller 72 will be immediately above and in contact with the center of the disk 65. When in such position, which corresponds with the coincidence of the recording-pen 62 with the base or datum line of the dynamometrical curve, rotation will not be imparted to the roller 73 by the disk 65. When, however, by the movement of the piston 54 and the rod 70, which, as described, is intermediately connected therewith, the roller 73 is moved outwardly from the center of the disk 65, it receives rotation from said disk at greater or less velocity, proportionately to the distance which it is moved from the center thereof. Each revolution of the roller 73 represents a definite constant of the area to be determined—that is to say, a certain number of foot pounds or units of the tension upon the draw-bar in pounds multiplied by the distance in feet traversed—such constant having been previously determined by test and calculation. Each revolution of the disk 65 represents a definite number of feet traversed by the car, distances less than that corresponding to a single revolution of the disk being indicated by graduations upon the periphery of the disk, which may be accurately read by means of a vernier, 74.

The number of revolutions of the disk 65 and roller 73 are respectively registered upon the web of paper, 4, by any selected two of a series of electro-magnetic recording-pens, 75, hereinafter to be more fully described, that are arranged in a "make" circuit, the circuit being completed at each revolution, as follows: In the case of the disk 65, a pin, 76, of non-conducting material—as ivory or bone—brings into contact at each revolution of the disk two metallic plates, 77 78, secured upon an insulating-support, 79, and connected, respectively, to wires 80 and 81, one of which leads to a battery-cell located in a compartment beneath the car, and the other to one of the binding-posts of the electro-magnetic recording-pen selected for the registration.

The making of the circuit for indicating the revolutions of the roller 73 is effected as follows: The shaft 72 of said roller is surrounded by a ring, 82, of non-conducting material, around which is another ring, 83, of copper or other conducting material, adjoining which is a third ring, 84, of larger diameter and of non-conducting material. A radial strip, 85, extends through the ring 84 into contact with the ring 83. A plate, 86, of non-conducting material, is secured to the frame 71, in which the roller 73 rotates, and two metallic plates, 87 88, are fixed to the plate 86, one of said plates bearing upon the periphery of the conducting-ring 83 and the other upon that of the non-conducting ring 84. Wires 89 90, connected to the plates 87 88, respectively, lead therefrom to the battery and to one of the binding-posts of the recording-pen which registers the revolutions of the roller 73. It will be obvious that the circuit will be established upon the contact of the strip 85 with the plate 88, which occurs once in each revolution, and the recording-pen will be simultaneously actuated. The respective graphical records of distance run and resistances exerted will obviously be made in fixed relation one to the other, and can hence be subdivided into portions of any desired length when under examination.

Mile-posts, section-posts, bridges, stations, and other points which it may be desirable to record are noted by the operator as the same are passed by the car by actuating a push-button or ordinary telegraph-key, which establishes a circuit connected with one of the electro-magnetic recording-pens 75, and in order to notify the operator to be in readiness to record the mile-posts a toothed indicating-wheel, 91, is arranged so as to be rotated intermittently by the disk 65, each revolution of which moves the wheel 91 a distance equal to the space between two teeth, the number of teeth of the wheel 91 being equal to the number of revolutions of the disk 65 in the traverse of one mile by the car. The pin 76 of the disk 65 serves as a tooth to engage, in passing, the teeth of the wheel 91. A pin, 92, of non-conducting material, on the wheel 91, at each revolution thereof brings into contact two metallic springs, 93 94, thereby completing an electric circuit through wires 95 96, connected, respectively, to said springs and to a battery and an electric bell or gong. An observation of the position of the pin 92 will also serve as an indication of the proximity of a mile-post; but the notification by sound, as described, is found desirable in facilitating the attention of the operator to his other duties.

An apparatus for indicating the number of revolutions of the driving-wheels of the locomotive is shown in Fig. 17, the same consisting of a break-circuit attachment to a locomotive guide-bar. A plate, 97, of metal, is secured to one end of the guide-bar, and a wire, 98, is connected to said plate, with the interposition of a strip of insulating material, 99. A metal spring, 100, is connected at one end to the plate 97, and at the other bears against a rod or bar, 101, which is in communication with the wire 98. A circuit is thereby established through the wire 98 to a wire, 102, which may be either connected to the plate 97 or to any metallic portion of the engine, said wires extending to one of the "break-circuit" recording-pens 75 and to a battery-cell. The plate 100 is so located as to be moved out of contact with the rod 101 by the cross-head at each stroke, thereby breaking the circuit and correspondingly releasing the recording-pen to register said stroke upon the web of paper, 4.

An anemometer of any approved construction having a make-circuit attachment adapted to indicate the revolutions of the instrument for tenths of miles is connected by wires with one of the make-circuit recording-pens 75, and from the registration of its indications, as compared with that of the speed of the car, the velocity and resultant pressure of the wind may be deduced.

The distribution of fuel and water-consumption, the periods of firing and of emission of smoke from the stack, and other analogous details of the operation of the engine are respectively indicated and registered by circuit-closers each connected by wires with one of the recording-pens 75.

As before remarked, the indication and registration of the spaces or instants of time within which tractive resistances are exerted are an essential element in the determination of said resistances and the power expended in overcoming them. Such indication and registration are effected by a time-piece, 102, connected to a stand upon the frame 7 and provided with circuit-closers operated by its mechanism, which respectively close electrical circuits in periods of seconds, ten seconds, and minutes, or any other periods that may be desired. Each of said circuit-closers is connected by wires with a recording-pen 75 and a battery-cell, and graphical records of the respective periods are thereby made upon the web of paper, 4.

The construction and arrangment of the electro-magnetic recording-pens and their electro-magnets and armatures are shown in Figs. 18 to 21, inclusive. The pens 75 are preferably glass tubes of small diameter drawn to a fine point at one end, and a solution of eozine is found to be a desirable material for marking the indications upon the paper. In this instance twelve pens are employed, arranged in line as closely as may be above and transversely to the web of paper, a greater or less number being applicable, as circumstances may require. Each pen is fitted in a socket on one end of a bar, 104, the other end of which is coupled to an armature-lever, 105, pivoted vertically to a frame, 106, connected by an arm or bracket, 107, to a transverse bar of the main frame 7 of the recording apparatus.

The electro-magnets 108 are arranged in pairs in line longitudinally, their cores projecting downwardly below their heads for such distance as to present a contact-surface of the full width of the armatures 109, which are located on opposite sides alternately of the armature-levers 105, and the latter, with their connected pen-bars, may thus be placed in close lateral relation. Springs 110, connected to the armature-levers and to posts on the frame 106, move the armature-levers upon their pivots to withdraw the armatures from the cores of the electro-magnets upon the making or the breaking of a circuit, as the case may be, a portion of the electro-magnets being connected for make-circuits and the remainder for break-circuits. A transverse bar, 111, connected to pivoted arms 112, serves to simultaneously elevate the series of pen-bars 104 and pens 75, so as to remove the latter from contact with the paper whenever desired. Wires 113, attached to binding-posts 114, connect the respective electro-magnets with their battery-cells and circuit opening and closing devices. The surplus marking material which may be deposited on the web of paper, 4, is removed therefrom by a blotter, which is wound upon a transverse roller, 115, fitted in bearings in the frame 7.

So far as described it will be seen that the determination and registration of tractive resistances do not comprehend the investigation of the character and condition of the track over which the load has been hauled, the circumstances of which, as will be obvious, necessarily affect, in greater or less degree, the exertion of power and the opposition of resistance. A mechanical track inspection, when made simultaneously with a determination of tractive effort and resistance, affords the ability of analyzing the record of such effort and resistance relatively to its modifying elements, which cannot otherwise be arrived at, in addition to the special function of said mechanical inspection—to wit, the ascertainment and graphical record of the alignment, profile, and state of perfection as to vertical and horizontal irregularities of the track. The manner of and means for effecting such track inspection will now be described.

In the measurement and delineation of the vertical irregularities of the track a datum-plane or wheel-base is instituted by the contact with the rail of two trucks, two wheels of a truck, or two wheels in a rigid frame. The vertical movements of another wheel and axle, located either within or without the length of said wheel-base, relatively thereto, as produced by the vertical irregularities in the rail over which said last-named wheel, which may be termed the "measuring-wheel," passes, are communicated through intermediate connections to a recording-pen, which marks upon a web of papers a series of indications the length of each of which bears a fixed ratio to the vertical movement of the measuring-wheel by which said indication has been produced.

An apparatus for measuring and recording vertical irregularities of track-rails is shown in Figs. 2, 3, 4, 9, 10, and 11. In this instance the outer axles, 117 118, of the truck 2 have been selected as defining the longitudinal terminations of the datum-plane from which the irregularities are measured, and the wheels 116 of the central axle, 16, act as the measuring-wheels for the lines of rails 119 and 120, respectively. The wheels 116 constitute bearers, which are moved along the tops of the rails by the travel of the car. Inasmuch as the function of each measuring-wheel is fulfilled upon the line of rails upon which it runs irrespective of the other line, and as each is separately connected to a recording-pen, said measuring-wheels might, if preferred, be secured upon separate axles, or the axle 16 might be divided into independently-rotating sections. The box 121 of each of the measuring-wheels 116, which is fitted to move vertically in a pedestal, 122, in the usual manner, is coupled by a vertical rod or stem, 123, to an arm, 124, secured upon a transverse horizontal shaft, 125, mounted in bearings on the frame of the truck 2. An arm, 126, secured to and projecting downwardly from the shaft 125, is connected by a link, 127, with an arm, 128, on a vertical shaft, 129, the lower end of which rests in a step or bearing on the frame of the truck, and which extends through the floor of the car and is supported at its upper end in bearings on the frame 7 of the recording apparatus. It will thus be seen that each of the vertical movements of the box 121, due to the passage of its wheel 116, as the case may be, over inequalities or elevations or depressions in the rails, will axially vibrate the shaft 129, the extent of such vibration bearing a fixed and known relation to that of the corresponding movement of the box.

In order that the movements of the shaft 129 may be rendered independent of the vertical and lateral movements of the car-body said shaft is formed in three sections, which are connected, respectively, by universal joints 130 136 and a coupling, 131, one member of which is adapted to slide within the other longitudinally to the shaft, the members engaging by squared faces, so as to be vibrated together in any longitudinal relation which they may assume one to the other.

A horizontal arm, 132, secured to the upper end of the shaft 129 below the table 8, is connected by a link, 133, to the lower end of a vertical double-armed lever, 134, pivoted to the frame 7, the upper arm of said lever being in turn coupled by a link, 135, to a pen-arm, 137, pivoted to a transverse bar of the frame 7 and carrying upon its free end a recording-pen, 138, which, as its arm 137 is vibrated upon its pivot, marks the indications of the vertical traverse of the box 121 upon the web of paper, 4.

While any bearer or wheel having no weight upon it and moving in contact with the track-rail as the car passes along would serve to detect any permanent high or low points in the rail, it would not detect the presence of any looseness of the rail, owing to its being insufficiently supported, and which would result in a temporary deflection under the weight of the moving car or vehicle. To detect any such points of temporary deflection, it is necessary to employ a bearer, which supports a portion of the weight of the moving vehicle, and the measuring-wheels 116 operate under such conditions. By reference particularly to Fig. 3 it will be seen that the weight of the car is transmitted from the truck-frame through the springs $s$ and equalizing-bars $s'$. These bars each bear at one end upon the axle-box of the main supporting-wheels of the truck and at the other end upon the axle-box 121 of the measuring-wheel 116. I have shown the springs $s$ as bearing upon the equalizing-bars $s'$ nearer one end than the other, and the distance from each spring to the axle 16 of the measuring-wheel 116 may be about twice as great as from the spring to the axle of the main supporting-wheel forming the end of the datum-plane. Consequently it will be seen that the measuring-wheels 116 will receive about one-third of the weight, or is supported by the truck, and by the very weight which is upon them the wheels 116 will produce a deflection of the rails, or any point where they are insufficiently supported, and by the vertical movement of their boxes 121 the recording-pens will indicate such temporary deflection upon the web of paper, 4, and, if it is any greater than the established minimum, will produce the marking of the rail by the ejection of fluid thereon, as will be hereinafter described.

While, as will be seen, the mechanism before described ascertains and produces a graphical record of each of the separate vertical irregularities existing in the track passed over, its record does not indicate the sum total in feet and inches for any given or desired distance, the ascertainment of which sum total is in many cases necessary or desirable. For the purpose of obviating the necessity of deducing the sum total by calculation from the graphical record an apparatus for mechanically summing up the irregularities and indicating their sum at given intervals is provided, the same being illustrated in Figs. 32 to 34, inclusive.

The summing-up mechanism is applied separately and similarly to each of the measuring-wheels 116, and in each case is connected to and supported by a vertical plate, 139, secured to the pedestal 122 of the measuring-wheel, or otherwise connected with the truck, said mechanism being closed in by a cap or case, 140. The vertical movements of the box 121 act successively to rotate intermittently and in one direction a disk, 141, secured upon a horizontal shaft, 142, which is mounted in bearings in the plate 139 and in a plate, 143, bolted thereto. Such intermittent rotation is imparted to the disk 141 by a double-armed pawl-lever, 144, formed in two plates or sections, which are bolted together, one on each side of the disk 141, and journaled near their longitudinal centers upon the shaft 142, so as to have the capacity of being vibrated freely thereon in either direction. The pawl-lever 144 is coupled at one of its ends, through the intermediation of a ball-and-socket joint, 145, to the upper end of a vertical rod or stem, 146, the lower end of which is coupled by a ball-and-socket joint, 147, to the box 121. The connection of the pawl-lever 144 and rod 146 may be made either directly, as described, or intermediately, as shown in the drawings, in which latter case the ball-joint 145 is formed in a projection upon a block, 148, fitted to slide vertically in guides 149 upon the plate 139, and coupled by flexible straps 150 151 with the ends of a segment, 152, formed upon one end of the pawl-lever 144, the upper end of the segment being connected to the lower end of the block, and vice versa. Driving-pawls 153 154 are pivoted to the pawl-lever 144 on opposite sides, both vertically and horizontally, of the axial line of the shaft 142 of the disk 141, the inclined free end of each of said pawls being in advance of a line drawn from the center of its pivot to the center of the disk, and being pressed to the periphery of the disk by a spring, 155. Vibratory movement in the direction of the arrow, Fig. 32, is hence imparted to the disk 141 by each upward movement of the rod 146, and the pawls 153 154 being pressed to the disk with a degree of friction greater than that required to rotate the disk, their action is at all times exerted coincidently with the vibration of the lever in the direction of rotation, thus avoiding lost motion as between the pawls and disk, which, in ratchet or other ordinary mechanism for intermittent rotation, is necessarily incident and would destroy the accuracy of the indications of the mechanism above described and render it impossible to apply any determined constant for the correction of errors. Movement of the disk 141 in the opposite direction is prevented by a retaining-pawl, 156, pivoted to the frame-plates 139 143 and pressed against the disk by a spring, 157.

To obviate tendency to unequal wear upon the bearings, it may be found desirable to employ an additional retaining-pawl and spring connected to the plate 143 below the pawl-arm 144. A pad, 65, of fibrous material, which is saturated with oil and secured to the pawl-arm 144, serves to remove dust or foreign matters from the periphery of the disk and to afford proper lubrication to the same.

Each quarter-revolution of the disk 141 is recorded by one of the make-circuit recording-pens 75 upon the web of paper, 4, said quarter-revolutions being obviously equivalent to a known amount of vertical elevation of the box 121 and rod 146, as, say, six inches. The making of the circuit of the recording-pen is effected by a circuit-closer consisting of two metallic springs, 158 159, secured to a plate, 165, of non-conducting material, attached to the frame-plate 143, said springs being connected, respectively, to wires 160 161, extending to a recording-pen and to a battery-cell. The spring 158 bears upon the periphery of a ring, 162, of non-conducting material, which encircles a ring, 163, of copper or other conducting material, secured to the shaft 142, but insulated therefrom by a ring, 164, of non-conducting material, four radial projections, 166, being formed upon the ring 163 and extending therefrom through the insulating-ring 162 to the periphery of the latter. The spring 159 bears continuously upon the outer end of the ring 163, and it will thus be seen that an electrical circuit will be established four times in each revolution of the disk 141 by the contact of the projections 166 with the spring 158. Two of these are made of greater length circumferentially of the ring 162 than the others, so that they shall maintain the circuit established for a longer period, thereby causing the recording-pen to register half-revolutions by different indications from those which show quarter-revolutions. A greater number of projections is employed where it is desired to sum up and record the total elevation for distances less than those represented by a quarter-revolution of the disk.

Figs. 1, 2, 3, 4, and 5 illustrate an apparatus for measuring and recording lateral inequalities in track-rails. A horizontal shaft, 167, is fitted with the capacity of vertical movement in pedestals 168, secured to the lower frame-bars of the truck 2. Springs 169, bearing upon the shaft 167 adjacent to each of its ends, maintain it in proper position horizontally for operation, from which position it may be raised, so as to elevate its wheels clear of the track-rails, when desired, by chains 170, connected to a hoisting-shaft, 171, fitted in bearings in the upper portion of the truck-frame and carrying a ratchet-wheel, 172, through which it may be rotated by a lever applied from within the car and passing through an opening in the floor thereof. A disk, 173, having a long hub, is fitted to rotate freely upon the shaft 167 adjacent to each of its ends, with the capacity, also, of motion longitudinally upon said shaft, the normal position of the wheels 173 in operation being such that their outer sides shall be in contact with the inner sides of the treads of the track-rails 119 and 120, respectively, toward which the disks 173 are pressed by springs 174, bearing against collars 175, fixed upon the shaft 167, and against sleeves or collars 176, which have internal feathers fitting splines or grooves on the shaft, and are thereby adapted to slide longitudinally, but without axial movement, thereon, said collars 176 bearing against the inner ends of the hubs of the disks 173. The tendency of the springs 174 thus acting to maintain the disks 173 constantly in contact with the inner sides of the rails 119 120, it will be seen that said disks and the adjacent collars 176 will be moved laterally upon the shaft 167 coincidently with and correspondingly to the existence and extent of variations or irregularities in the gage or lateral relation of the lines of rails 119 and 120, and the indications deduced from said movements illustrate the portions of the track which are in correspondence with any fixed gage, as well as those that vary from it, as also the alignment of each line of rails. A graphical record of each of the lateral movements of each of said disks is formed upon the web of paper, 4, by the following means: The collars 176 are coupled by rods 177 with arms 178, secured upon vertical shafts 179, supported in bearings on the frame of the truck and extending through the floor of the car to bearings in the frame 7 of the recording apparatus below its table 8. The axial movements of the shafts 179, induced by the lateral movements of the collars 176, bear, as will be seen, a fixed relation to said lateral movements. Arms 180 upon the upper ends of the shafts 179 are connected by links 181 to the lower arms of vertical double-armed levers 182, the upper arms of which are coupled by links 183 to pen-arms 184, pivoted to a transverse bar on the frame 7. Recording-pens 185 upon the free ends of the arms 184 mark upon the web of paper the graphical indications of the lateral traverse of the disks 173, by which, as above described, their actuating-shafts 179 are respectively vibrated. The shafts 179 are each formed in three sections, connected by universal joints and couplings admitting of independent longitudinal and vertical movements of the sections, while maintaining their simultaneous axial movement in the same manner and to the same end as in the case of the shafts 129 of the mechanism for measuring and recording vertical irregularities, hereinbefore described.

For the purpose of returning the disks 173 to their normal position between the lines of rails when, by reason of irregularities of peculiar nature—as, for example, an inwardly-projecting rail end or the point of a frog against which one of the disks may strike—they may have been so far displaced as to mount and ride upon the tops of the rails, bell-crank levers 186 are pivoted to the truck-frame, the ends of their lower arms resting against the outer faces of the hubs of the disks 173 and their upper arms being connected by ropes or chains 187 to handles 188 within the car. By raising the levers 186 the disks 173 will be pressed inwardly for the required distance, and upon the release of the levers will be free to be pressed outwardly by the springs 174, as before described.

An apparatus for ascertaining and indicating the elevation of the outer rail upon curves, applicable without change in principle to the indication of gradients, is shown in Figs. 1, 2, 4, and 22. Two reservoirs, 189, connected at bottom by a pipe, 190, are arranged in line transversely to the car upon a support on the frame of the truck 2. The reservoirs 189 are circular in horizontal section and are curved so as to form segments of rings, the center of curvature of each coinciding with the axial line of a rock-shaft, 191, mounted in bearings on a standard, 192, on the longitudinal center line of the truck. Floats 193 are connected by rods 194 with arms 195 on the rock-shaft 191, said floats resting upon water or other suitable liquid medium in the reservoirs 189. The lateral inclination of the truck, induced by the greater or less elevation of the outer rails on curves around which it passes, will, by reason of the corresponding flow of liquid from one reservoir to the other through the pipe 190 in maintaining its equilibrium, move the rock-shaft 191 axially in accordance with the degree of such elevation. The axial movements of the rock-shaft are caused to actuate a recording-pen, 196, by which they are indicated upon the web of paper, 4, in fixed ratio to the respective elevations of the outer rails to which they are due. For this purpose segment-arms 197, the outer ends of which are of curvature concentric with the rock-shaft 191, are secured upon said shaft, and cords 198, connected to the lower ends of the segment-arms and passing freely over their faces, are led between guide-pulleys 199 into and through a central opening in the king-bolt 200, from which, passing between guide-pulleys 201 above the floor of the car, they are connected on opposite sides of its center to a pulley, 202, secured on a horizontal shaft, 203, fitted in bearings on the frame 7 in the longitudinal central plane of the car. Cords 205 are connected to the periphery of a pulley, 204, on the shaft 203, and, after being led around guide-pulleys 206 on the frame 7, are connected to the opposite ends of a bar, 207, which is fitted to slide above and transversely to the web of paper, 4. The recording-pen 196 is connected to a pen-arm, 208, on the bar 207, and its indications, as moved transversely in one or the other direction by the changes of vertical position of the floats 193 through the intermediate connections above described, illustrate graphically upon a determined scale the respective elevations of the outer rails upon the several curves as traversed by the car.

The determination and indication of gradients is effected by mechanism which is similar structurally in all substantial particulars to that last above set forth, and which differs in application only in the particular that the two fluid-reservoirs are located in line longitudinally upon the car, in lieu of transversely, as in the case of the mechanism for indicating rail elevation upon curves.

An apparatus for delineating the alignment of the track and for determining and indicating the radii of the curves thereof is illustrated in Figs. 1, 2, 7, 8, 23, 24, 25, and 26. A supplemental or measuring truck, 209, supported by wheels 211, secured to an axle, 210, is located in any desired position between the main supporting-trucks 2 3 of the car and coupled by radius-bars 212 to the center casting of the truck 2, so as to have the capacity of radial movement relatively to the axis thereof in passing around curves and of moving in line longitudinally with said axis upon tangents. A tubular shaft, 213, secured centrally in the hub of the radius-bars 212, passes through a central opening in the king-bolt 200 to a point below and adjacent to the table 8 of the recording mechanism, and an arm secured to said shaft near its top is coupled by intermediate links and a double-armed lever to a pen-arm, 214, carrying a recording-pen, 215, by which the indications of the movements of the truck 209 relatively to the longitudinal center line of the car as induced by the passage of said truck around curves are marked upon the web of paper, 4, intermediate tangents being likewise indicated by the parallelism of the line drawn by the recording-pen with the line of traverse of the paper.

In order to enable the truck 209 to be raised from the rails when its operation is not required, compressed air may be utilized as taken from a cylinder, 216, which may either be the ordinary air-brake cylinder or one specially provided for the purpose. A vertical cylinder, 217, (one or more,) is secured upon the frame of the truck 209, and is connected, near its upper and lower ends, respectively, by pipes 222 223, with a vertical pipe, 224, in which is located a four-way cock, 225, communicating by a pipe, 226, with the compressed-air cylinder 216, and also communicating with an exhaust-pipe, 227. The pistons 219 of the cylinder 217 are secured upon the lower ends of rods 218, passing through stuffing-boxes in the upper cylinder-heads and having blocks 220 upon their upper ends, which fit in a slot in a curved guide-bar, 221, secured to the sills of the car below the floor. The radius of curvature of the slot in the guide-bar is equal to its distance from the center of the king-bolt 200, and the blocks 220 are fitted to move freely longitudinally in the slot, but are restrained from vertical movement by upper and lower lips or flanges. It will thus be seen that the cylinders and their piston rods and blocks are free to follow the lateral movements of the truck 209, and that by the admission of compressed air to the cylinders above or below their pistons, as the case may be, the cylinders and the truck to which they are secured will be raised from or lowered to the track, such admission being effected, as desired, by proper manipulation of the cock 225. In Fig. 24 said cock is shown in the position which it occupies during the operation of the supplemental truck, compressed air being shut off from the cylinders. In Fig. 25 air is being admitted above the pistons to raise the truck from the rails, and in Fig. 26 air is being admitted below the pistons to lower the truck to working position.

It will be seen that the application of compressed air, as above set forth, affords additionally a desirable spring arrangement for the supplemental truck 209, as well as enables the pressure upon said truck to be increased or diminished, as desired.

An apparatus for instituting comparison between tracks laid with "broken" and with "opposite" joints, respectively, relatively to the extent of the vibration or jarring that may be due or incident to the employment of one or the other of said systems is shown in Figs. 1 and 2. A flexible metallic arm, 228, which is secured at one end to a transverse bar of the frame 7 of the recording mechanism, carries at or near its free end a weight, 229, the tendency of which is to oscillate vertically under the influence of jars or shocks that may be imparted to the car-body. The free end of the arm 228 is coupled to one arm of a bell-crank lever, 230, pivoted to a bracket upon the frame 7 or table 8, and a recording-pen, 231, is attached by a link or connecting-rod to the opposite arm of the lever 230. The greater or less number of movements of the pen induced by the vibrations of the weight 229 in the passage of the car over a given length of track laid with either system affords a basis of comparison as to the extent of the jars or shocks to car-bodies which they respectively produce.

For the purpose of marking upon the web of paper a series of parallel longitudinal lines at such determined distances apart as will designate known measures of the data recorded in the graphical indications which are made by the apparatus before described, a ruling-bar, 232, is mounted in bearings above and transversely to the table 8. A series of ruling-pens is connected adjustably to the ruling-bar 232, the several pens or groups of marking-points of the series being so selected and adjusted as to mark on the paper, in its traverse beneath them, lines which are spaced laterally at such distances as may be required. The ruling-bar may be rocked in its bearings so as to simultaneously raise all the ruling-pens from contact with the paper.

An apparatus for marking upon the track-rails the location and general character of their surface or vertical undulations or unevennesses greater than a determined minimum is illustrated in Figs. 6, 8, and 27 to 31, inclusive. In said apparatus vertical movements of a measuring wheel or slide relatively to a datum-plane or wheel-base, instituted by the contact of two other wheels or series of wheels with a line of track-rails, (said vertical movements being induced by surface irregularities or inequalities in said line of rails,) are caused to actuate mechanism by which paint or coloring material is applied to the rails at or adjacent to the locations thereon at which such inequalities occur. In the instance shown each of the wheels 116 of the central axle, 16, of the truck 2 has been selected as the measuring element of the inequalities of the line of rails on which it runs, and the contact of the wheels of the end axles, 117 118, with the rail establishes the terminals of the datum-plane or wheel base from which said inequalities are measured. I likewise contemplate the employment of a slide or trailing piece, the lower surface of which bears upon the rail and which is adapted to move vertically in guides, as a measuring element, and, in the institution of the datum-plane, may use as its terminals either the two trucks of the car, one truck and an independent axle and pair of wheels, or two independent axles in rigid bearings on the car-body.

Referring more particularly to Figs. 6 and 8, a horizontal bar, 233—one upon each side frame of the truck—is supported at its ends upon the boxes 234 235 of the end axles, 117 118, of the truck 2, to the tops of which it is connected by ball-joints. Forcing-chambers 237, connected by pipes 238 with a reservoir, 239, containing paint or coloring material of suitable character, are secured upon the bars 233 adjacent to the boxes 121 of the measuring-wheels 116, each chamber having a discharge-pipe, 240, the lower end of which is in convenient proximity to the adjacent line of rails. The boxes 121 of the measuring-wheels are coupled by vertical rods or stems 241, with a valve mechanism connected with the forcing-chambers 237, and to be presently described, by which at each elevation and depression of the box for a distance greater than a determined minimum irregularity of rail-surface a quantity of coloring material is drawn from the reservoir and ejected through the discharge-pipe 240 upon the rail adjacent to the irregularity by which such movement of the box has been produced. The chambers 237 (see Figs. 27 to 29, inclusive) are divided by transverse partitions 242 into upper and lower compartments, 243 244, each closed at its outer end by a tight head. A piston, 245, fitting the bore of the upper compartment, 243, is secured upon a piston-rod or plunger, 246, which passes through the partitions 242 and projects into the lower compartment, 244. The discharge-pipe 240 communicates at its upper end with the lower compartment, 244, and a discharge-valve, 247, is held by a spring, 248, to a seat in the lower end of the pipe 240, in which position it closes the discharge-opening 249 of said pipe, which is formed upon the side thereof adjacent to the seat of the valve 247. A supply-valve, 250, is seated and guided so as to open upwardly in a casing which communicates above the valve 250 with the lower compartment, 244, of the forcing-chamber, and below the valve 250 with the pipe 238, which leads to the paint-reservoir 239.

The piston 245 and plunger 246 are reciprocated by compressed air supplied through a pipe, 251, from the air-brake cylinders 216, or from a special reservoir, to a valve-chest, 252, having ports which communicate, respectively, with the upper compartment of the forcing-cylinder above and below the piston and with an exhaust-pipe. A slide-valve, 253, secured upon a stem, 254, works over a valve-face in the chest 252 and governs the ports thereof, so as to admit and exhaust the motive fluid above and below the piston 245, as required. The valves 253 are actuated by the vertical movements of the rods 241, to which, as before stated, the boxes 121 of the measuring-wheels are connected. The rods 241 pass freely through openings in frames 255, secured to the boxes 121, the lower transverse bars of said frames bearing against collars 256, secured to the rods 241, between which collars and the upper bars of said frames are placed helical springs 257. Arms 258 are secured adjustably to the rods 241 adjacent to their upper ends, said arms being adapted to bear in the downward traverse of the rods 241 upon transverse bars 259, connected by the vertical rods or stems 260, fitting in guides upon the valve-chests 252, to transverse bars 261, secured to the stems 254 of the valves 253. Helical springs 262, surrounding the rods 260, bear at their upper and lower ends, respectively, against shoulders on the rods 260 and against stops on the valve-chests, the action of said springs being to maintain the valves 253 in their uppermost positions—that is, those in which they fully uncover the ports leading to the compartments 243 below the pistons 245.

In operation the upward movement of either of the axle-boxes 121 and its connected frame 255 elevates the rod 241 through the collar 256, withdrawing the arm 258 from its contact with the bar 259 and permitting the springs 262 to raise the valve 253 and piston 245, the upward movement of which draws paint from the supply-pipe 238 into the lower compartment, 244, and discharge-pipe 240 of the forcing-cylinder 237. Upon the downward movement of the box 121 and frame 255 the arm 258 depresses the bar 259 and connected valve 253, the tension of the spring 257 being sufficient to overcome the resistance to the movement of the valve, and by the consequent downward movement of the piston 245, produced by the admission of compressed air above it, the compressive action of the plunger 246 ejects a quantity of paint sufficient to form a plain mark upon the side of the rail through the discharge-opening 249, the discharge-valve 247 being thereafter returned to its seat by its spring 248 upon being relieved from downward pressure.

The position of the arm 258 upon the rod 241 is adjusted in accordance with the determined minimum vertical inequality of the rails which is to be marked, so that movements of the rod effected by inequalities of less extent will fail to actuate the slide-valve 253 and the piston and plunger of the forcing-chamber, and therefore will not effect the ejection of paint upon the rail, and in movements of greater extent the yielding of the spring 257 under compression prevents breakage of the parts.

A modification of the discharge pipe and valve is shown in Fig. 30, the same consisting of a movable section, 263, connected by a coupling, 264, to the main body of the discharge-pipe, so as to be capable of being moved to vary the relation of its outlet to the rail. Such construction likewise presents the advantage of reducing the risk of breakage of the discharge-pipe from contact with ballast or other articles upon the road-bed, the coupling permitting the lower section to yield and swing out of position when struck by said objects. The discharge-valve and its spring are in this case located adjacent to the discharge-opening, which is at the lower end of the section 263.

Under certain circumstances—as in trucks of particular construction—it is not practicable to locate the supporting-bar 233 of the paint-ejecting apparatus as shown—that is to say, in close proximity to the tops of the boxes and having its valve operated by a rod extending upwardly from the box of the measuring-wheel. In such instances the supporting-bar is connected to the end boxes by ball-jointed rods of such length as may be necessary, and is connected by downwardly-projecting rods or hangers with a lower supplemental bar extending horizontally below the box 121 of the measuring-wheel. The forcing-chamber 237 is secured to said lower bar, and its slide-valve is operated by a rod extending downwardly from the box 121 and operating similarly to the rod 241, before described.

In order to indicate upon the rails the location of high points separately and independently of the indications of low points, and thereby to evidence as fully as may be the character and extent of deflections and irregularities in the rails, whether temporary, as caused by the passage of a load over them, or in the form of a permanent set, as low joints, undulations due to ties insufficiently or excessively tamped, bends in rails as rolled, &c., I attach to the supporting-bar 233 an independent forcing-chamber and paint-reservoir (which may be termed the "high-point marker") supplied with a coloring material of different hue from that of the first-described apparatus, (which may be termed the "low-point marker") and operate the slide valve of said independent forcing-chamber or high-point marker by a connection with the box 121, operating similarly, but in reverse direction, to that of the low-point marker—that is to say, the downward movement of the box 121 acting to draw paint from the reservoir and the upward movement to eject it upon the rail.

Fig. 31 shows a construction in which the paint-reservoir 239 is connected directly with the compressed-air cylinder by a pipe, 265, the discharge being effected by the movement of a cock, 266, actuated by the vertical movements of the box 121.

I likewise contemplate marking the indications upon the rails by means of a paint-brush operated by connections to the box 121, but the employment of a reservoir and means for ejecting the coloring material I deem more convenient and desirable.

A record of the several markings as made upon the track-rails by the before-described apparatus is made upon the web of paper, 4, by one of the recording-pens 75, the electro-magnet of which is connected by wires with a battery-cell and with a suitable circuit-closer attached to the arm 258 of the rod 241, the same serving to establish a circuit at each actuation of the slide-valve 253 by said rod, and thereby to cause the recording-pen to be coincidently operated. A separate circuit-closer, ratchet mechanism, and recording-pen, connected with the arm 258, enables a record to be made of every tenth operation of the paint-ejecting apparatus, to the end of facilitating the counting of the number of markings per mile or section.

For the purpose of marking upon the rails the locations at which the lateral distance between them exceeds the prescribed gage, I employ a paint-reservoir similar to that shown in Fig. 31, supplied with paint of a different color from that or those used for marking vertical irregularities, and connected by a pipe with a compressed-air cylinder. The stem of the discharge-valve 266 of the paint-reservoir is connected by arms projecting on each side of its axis with the sliding collars 176 of the shaft 167, which carries the wheels 173, by which lateral inequalities are ascertained. Upon the outward movements of the wheels 173 and collars 176, induced by excess of the distance between the lines of rails above normal gage, the discharge-valve 266 will be opened and paint ejected therefrom upon the side of the adjacent rail, the discharge-valve being closed by the opposite movement of the wheels and collars.

The character of the irregularities indicated upon the rails by the marking apparatus will appear from the position of the markings relatively to the irregularities to which they respectively refer. For example, the arm of the rod which connects the box of the measuring-wheel with the paint-ejecting mechanism being set in correspondence with any given minimum of irregularity to be marked, as, say, five-sixteenths of an inch, the rails will be marked at the point of greatest deflection for irregularities of just such amount, and for greater irregularities, as permanent set in the rails, they will be marked at points more or less in rear thereof, say from one to eighteen inches, correspondingly with the increased amount of vertical deflection or elevation. Inasmuch as the mechanism is actuated immediately that the amount of deflection to which it has been set is reached, it will be obvious that it will not again operate until after the limit of the irregularity with which it is in contact has been passed, and consequently the greater the amount of such irregularity the greater will be the distance between the mark which indicates it and the point of its greatest deflection.

The electro magnetic counter, which is employed for registering the amount in feet and inches of irregularities of the rails for any given distance, is shown in Figs. 35 and 36, the same being also applicable to obtaining the sum total of other ascertainments made by the foregoing apparatus. An electro-magnet, 267, fixed upon a stand, 268, is connected by wires 269 270 with a battery-cell and with a circuit-closer communicating with a moving member of the mechanism whose measurements are to be recorded. The armature 271 of the electro-magnet 267 is pivoted to the stand which supports the electro-magnet, and carries upon an extension beyond its pivot a pawl, 272, which engages the teeth of a ratchet-wheel, 273, said ratchet-wheel being the prime mover of a train of registering-gearing, 274, by which counters are rotated upon dials 275, said counters serving to record the number of movements of the member with which the wires 269 270 are connected in the usual manner. Upon the completion of the circuit, which is effected at each of said movements, the armature is drawn toward the electro-magnet, releasing the pawl from the ratchet-wheel, and on the breaking of the circuit the pawl is pushed forward against said ratchet-wheel by a spring and partially rotates the same for a distance equal to that between two teeth, such movement being communicated correspondingly to the registering-gearing.

A portion of a graphical diagram, chart, or record embodying a series of graphical indications, each of which illustrates upon a determined scale an element of the conditions governing or bearing upon the ascertainment of data relative to traction, resistances, or condition of track upon railroads, is shown in Figs. 42 and 43. Said figures, when placed one above the other, will represent a section cut from the length of the web of paper on which the diagram is formed, but are here placed upon separate sheets to avoid such reduction in size as would impair their clearness. The several graphical indications are formed mechanically, simultaneously, and continuously upon a web of paper, their registration thereon being effected either directly by their respective mechanisms or intermediately through electrical connections therewith; and they bear a fixed mutual relation, so that the results which they set forth are susceptible of complete analysis and investigation as respects any one or more of the elements, or the comparison or relation of any selected two or more. The lettered designations in Figs. 42 and 43 of the sundry indications do not form an essential part of the diagram, as such designations may or may not be used, at the discretion of the operator. When applied, (which may be done either by hand or by printing mechanism connected with the recording apparatus,) they are placed in such locations upon the diagram as may be deemed desirable in facilitating a comprehension of it by those not fully conversant with the signification of the several lines to whom it is addressed.

Referring to Fig. 42, the lines 276 and 277 illustrate, respectively, portions of the indications made by the recording-pens of the mechanism for determining the vertical or surface inequalities of the right-hand and of the left-hand lines of rails, that portion to the left of the vertical center line of the figure showing the rails and joints to be in comparatively good condition and that on the right showing them as comparatively bad. The lines 278 279 give the summing up of the amount of vertical inequalities shown by the lines 276 277, respectively, as marked by the recording-pens of a summing-up apparatus. The lines 280 281 represent the indications made by the recording-pens operated by the mechanism for determining lateral inequalities in the track, said lines separately showing the inequalities of the right and left hand rails, respectively, and their relation one to the other indicating the degree of conformity of the track at different points with the prescribed gage. The line 282 represents the indication of the degree of curvature and alignment of the track as formed by the recording-pen of the apparatus before described, and shown in Figs. 7, 8, and 23 to 26, inclusive. The pen describes a central line on the chart when the car passes over a tangent and a parallel line to right or left of the central line, according to the degree of curvature. As drawn, the line 282 shows on the left that the car has passed from a curve of six degrees and thirty minutes. The intermediate portion shows the car to have passed over a tangent, and the right-hand portion a curve of one degree and thirty minutes. The line 283 represents the indication of the elevation of the outer rails upon curves made by the recording-pen of the apparatus for determining such elevation, as three and three-fourths inches on the left side and one and one-fourth on the right, and the line 284 the indication of the gradients and levels, a slight upgrade being shown on the right. The line 285 indicates the distance run, as determined by instrument, each break in the line representing a certain predetermined distance; the line 286 the location of mile-posts, stations, or other points to be noted, the break indicating the exact location, and the line 287 the side oscillations of the car, said line being drawn by a recording-pen connected to the free end of a lever which can vibrate laterally, as admitted by two springs connected to it at opposite sides. The line 288 is the indication of the ratios of work—that is to say, of the number of times that a given constant is repeated in calculating the resistance in foot-pounds, as recorded by the pen connected with the apparatus, Figs. 15, 16, and 16$^x$. The lines 289 and 290 are the time-record in seconds and ten seconds, respectively, and the lines 291 292 the record of the marks made upon the right-hand and the left-hand lines of rails, respectively, by the apparatus for marking vertical irregularities. The line 293, Fig. 43, is the indication of the vibrator for comparing broken and opposite systems of rail-joints as to the relative amount of shock or jar which they induce upon a car-body, and the line 294 the dynamometrical curve indicating the resistances momentarily exerted upon the draw-bar.

In order to present in abbreviated form in such manner as to be readily understood and in any desired quantities an interpretation and record of the data embodied in a graphical diagram of mechanical track-inspection, such as is shown in Fig. 42, as well as to serve the purpose of an index and guide to complete and specific details of said diagram, I provide a tabulation-blank, 295, Fig. 44, which is filled out from a graphical diagram of the character of that before described. The blank is divided horizontally into two or more portions, each portion being complete in itself and representing a particular length or division of track in separate miles and fractions thereof, known in railroad parlance as a "section." Each horizontal division of the blank is divided by vertical lines into a series of columns, which contain, respectively, spaces for the insertion in figures of the number of miles or parts of miles, the sum of the surface undulations, the sum of the lateral irregularities, the number of marks made upon the rails by the low-point-spotting apparatus, the gage of track, the frogs out of line, the alignment of track, the percentage of tangent and curve, the degree of curvature, the elevation of rail on curves, the percentage of level track, the percentage and inclination of gradients, the description of ballast and rail-joints, the number of years the rails have been in service, and sundry additional data, as tonnage per year, number of new ties put in, number of days' labor per section, number of car-loads of ballast per section, and general remarks as to surface character of rails. The column of surface undulations is subdivided into columns of feet and inches per mile for each line of rails, and of average in hundredths of inches per rail for each rail. The column of lateral irregularities is subdivided into columns of feet and inches per mile for each line of rails, and of greatest irregularity per rail for each line.

Blanks as above described are filled in in words and figures from the graphical diagram as produced for the several series of miles or sections of track inspected, and when so filled out present records which may be readily referred to and understood for any desired portion or portions of the line of railroad upon which the investigation has been made, said records presenting bases for comparison of different miles and sections, as well as indicating to those connected with the maintenance of way the character and extent of repairs which are desirable.

Fig. 45 shows a portion of a condensed graphical diagram of track-inspection—that is to say, one which is deduced from an original graphical diagram, Fig. 42, and from data embodied in a filled-out tabulation-blank, Fig. 44, and which illustrates in more compact form the salient features and important particulars of said original diagram and tabulation. In the preparation of a condensed graphical diagram I provide a sheet which is ruled into vertical and horizontal spaces, the former representing miles and the latter corresponding to different scales relatively to given base-lines, the sheet being divided horizontally by a line or lines of separation into two or more portions, in correspondence with the number of tracks inspected. Lines are drawn or plotted upon said sheet, each representing a certain ascertainment derived from an original graphical diagram and its tabulation, said lines being, respectively, those of condition of track, approximate amount of deflection of rails and joints, gage of track, side irregularities of rails, profile of road, alignment of track, brand and age of steel rails, &c. Beneath the general vertical rulings the several sections and divisions of the road are indicated, and the stations may also be marked at proper locations.

In plotting the lines the several indications or the means of the indications from which they are deduced are taken from the tabulation—thus, for example, in the line of condition of track, 296, the average vertical irregularity per rail in hundredths of inches is taken for each mile, laid down upon the ruled sheet, and the line of indication drawn either continuously from point to point or in steps or stages, the right hand of each mile or fraction of a mile terminating a section, being taken in the former case as the reading of said mile or part of a mile. The line of approximate amount of deflection of rails and joints 297 is constructed in a similar manner, the number of marks made upon the rails in connection with a determined constant serving as the means for fixing the heights above the base-line, and the line of lateral irregularities 298 is also similarly constructed. The lines of gage of track, 299, and age of steel, 300, are stepped vertically in accordance with the indications of the table, and excessive gage at different points is indicated by pendent lines giving the respective amounts. The brand of steel is indicated by letters between vertical lines marking the lengths laid with the several brands, figures showing the heights of rails being added when desired. The profile 301 is drawn by marking the elevation from base-line for each mile and connecting the points by lines. The alignment is indicated by vertical lines 302, showing in each mile the percentage of tangents and curves, the former being represented on the left hand and the latter on the right hand of the space for the mile, each space between the horizontal lines indicating a determined per cent. of tangent or curve, as the case may be. The difference in height from base-line of the lines of approximate amount of deflection of rails and joints, 297, and the line of condition of track, 296, represents approximately what may be termed the "condition of steel"—that is to say, the amount of minute vertical irregularities in the rails per mile or section.

The designations of miles may be marked in any convenient manner and position upon the diagram, in the instance shown being placed at every tenth mile upon the upper of the two general base-lines.

A condensed diagram, as above described, compactly but accurately presents the various ascertainments of track-inspection for a long line of road in such positions and relations one to the other that the condition of the road relatively as to perfection and comparatively as between different portions and indications of the concurrent circumstances affecting the same will immediately appear on inspection by the mile or section for the entire line.

In the examination of the results of track-inspection a material saving of time is effected to busy railroad-managers by the use of the condensed diagrams, which further afford them by a few moments' inspection such comprehensive knowledge of the general condition of a line as has never before been attainable, and which could not be gained from the filled-out tabulation-sheets or original diagrams after days of study. The value of the various ascertainments is consequently increased, and the knowledge thereof made more readily accessible and capable of wider dissemination, the indications being presented in such form as to be comprehensible without difficulty by those employed in subordinate positions in connection with maintenance of way, many of whom are comparatively unfamiliar with calculations or comparisons of figures. By the employment of lines and curves to illustrate the data shown by figures upon the filled-out tabulation-sheets the information is put in much more compact form and the relations of one line to another clearly exhibited, thereby giving a scope and capacity of comparison to said indications which can neither be rendered by nor comprehended directly from the tabulations or original diagrams, from the fact that for an inspection of any considerable extent the mass of figures of the former and the magnitude of the latter would be so great that the mind of the observer could not retain their relations either as to a part or parts or to the whole of the line.

By the use of heavy, light, and broken lines the indications of the same track for several inspections can be placed upon the same diagram, and the advantages or disadvantages of particular plans of doing work, systems of laying joints, &c., or those derived from the use of different materials, can be traced and compared. For example, the inspection of four hundred miles of track may be clearly shown in a condensed diagram sixteen by twenty-four inches in dimensions, and the same may be carefully examined in five minutes, while over one hundred and fifty filled sheets of double-track tabulation would be required to exhibit the figures, to examine and compare which with ordinary care would need from two to three days' time. To properly examine the original diagram would require from ten to twelve days.

A comparison of the relative smoothness of the various brands of steel as derived from the condensed diagram, Fig. 45, shows that on the uptrack—that is to say, that which is referred to on the upper half of the diagram—the steel from the eighteenth to the thirty-second mile has been in service twelve years and is much smoother than some steel of one years' service in the track from the thirty-second to the fifty-second mile. An analogous showing is made upon the downtrack. The brands A and C are further shown to be decidedly inferior to the brand D.

In the foregoing description I have set forth the application of the principles of my invention in what I deem to be the best and most favorable embodiment thereof to practical use. Numerous structural variations are, however, possible within the scope of the invention, and will readily suggest themselves to skillful constructors, and, further, the extent of the investigations rendered practicable by the invention may be abridged to such degree or in such particulars as economical or other reasons may indicate to be expedient or desirable.

I claim as my invention and desire to secure by Letters Patent—

1. The improvement in investigating the condition of the track-rails of a railway from a moving car, consisting in mechanically locating from the car irregularities or inequalities in the track-rails, and in mechanically and simultaneously marking from the moving car and upon the rails or other portions of the superstructure the location of such irregularities or inequalities, substantially as herein described.

2. The improvement in investigating the condition of the track-rails of a railway from a moving car, consisting in mechanically locating from the car irregularities or inequalities in the track-rails, and in mechanically and simultaneously from the moving car applying a marking-fluid upon the rails or other portions of the superstructure to indicate the location of such irregularities or inequalities, substantially as herein described.

3. The combination, with the draw-bar of a railway-vehicle, of an apparatus for measuring the resistance to traction exerted on the draw-bar, and comprising a liquid-cylinder and piston, mechanism, substantially as described, for producing the movement of a band of paper at a speed which bears a fixed relation to the speed of the car, and a marker controlled by the resistance-measuring apparatus for graphically recording on the paper the measured resistances, substantially as herein described.

4. The combination, with the draw-bar of a railway-vehicle, of an apparatus for measuring the resistances to traction exerted on the draw-bar, and comprising a liquid-cylinder and piston, mechanism for producing the movement of a band of paper, a marker controlled by the resistance-measuring apparatus for graphically recording on the paper the measured resistances, and mechanism for graphically recording on the paper the spaces of time in which the resistances are respectively exerted, substantially as herein described.

5. The combination, with the draw-bar of a railway-vehicle, of an apparatus for measuring the resistance to traction exerted on the draw-bar, and comprising a liquid-cylinder and piston, mechanism for effecting the traverse of a band of paper at a rate of speed in fixed relation to the speed of the vehicle, a marking device controlled by the resistance-measuring apparatus for graphically recording on the paper the measured resistances, bearers moving in contact with the track-rails to ascertain the particulars of character and conditions of track passed over, a marking device controlled by said bearers for graphically recording on the paper indications of said particulars simultaneously and in fixed relation to the indication of measured resistances, substantially as herein set forth.

6. The combination, with the draw-bar of a railway-vehicle, of an apparatus for measuring the resistances to tractive force exerted upon said draw-bar, and comprising a liquid-cylinder and piston, mechanism for effecting the traverse of a band of paper at a rate of speed in fixed relation to that of the car, a marking device controlled by the said resistance-measuring apparatus for graphically recording upon said paper the measured resistances, and mechanism, substantially as described, for similarly recording the particulars of performance of the locomotive-engine by whose motive power the resistances to traction are overcome, substantially as herein set forth.

7. The combination, with the supporting-wheels of a railway-vehicle, of wheels arranged between such supporting-wheels longitudinally of the vehicle and adapted to rotate idly by contact with the track-rails, vertically-movable boxes wherein the journals of the wheels are supported, mechanism for effecting the traverse of a band of paper at a rate of speed in fixed relation to that of the vehicle, markers, and connections between them and the vertically-movable boxes whereby they are operated to graphically record on the paper irregularities or inequalities in the track-rails, substantially as herein set forth.

8. The combination, with a railroad-car or other railway-vehicle, of mechanism for ascertaining the location of irregularities or inequalities in the track-rails, and mechanism for marking upon the rails or other portion of the superstructure indications of said irregularities, substantially as set forth.

9. The combination, with a railroad-car or other railroad-vehicle, of mechanism for determining the extent of irregularities or inequalities in the track-rails, mechanism for summing up the amount of said irregularities or inequalities into feet and inches or other units of measure, and mechanism for recording the summed-up amounts, substantially as set forth.

10. The combination, with a railroad-car or other railroad-vehicle, of mechanism for determining the extent of irregularities or inequalities in the track-rails, mechanism for forming a graphical record of said irregularities severally, mechanism for independently ascertaining and summing up the amount of said irregularities in feet and inches or other units of measure, and mechanism for separately recording the summed-up amounts, substantially as set forth.

11. The combination, with a railroad-car or other railroad-vehicle, of mechanism for determining the extent of irregularities or inequalities in the track-rails, mechanism for forming a graphical record of said irregularities severally, mechanism for marking upon the rails or other portion of the superstructure indications of the location of irregularities greater than a fixed minimum, and mechanism for forming a separate record of said indications, substantially as set forth.

12. The combination, with supporting-wheels for a railway-vehicle, of bearers arranged between the wheels lengthwise of such vehicle and bearing on the track-rails, and adapted to rise and fall as they pass defective portions of the track, an apparatus upon the vehicle for ejecting marking-fluid upon the rails or other portions of the superstructure at such defective portions of the track, a valve controlling the ejection of fluid by the apparatus, and connections through which the valve is operated by the rising and falling movements of the bearers, substantially as herein described.

13. The combination, with a railroad-car or other railroad-vehicle, of two axles and wheels, two trucks, or a truck and an axle and wheel, each of which supporting-structures by its contact with the track-rail serves as one of the longitudinal limits of a datum-plane, a measuring-wheel and axle, or a sliding contact-piece adapted to follow the vertical or surface inequalities of the track-rails independently of the datum-plane-limiting wheels, a paint or pigment reservoir, a compressed-air reservoir, and a rod or arm actuated by the vertical movements of the measuring-wheel and serving to effect the ejection of pigment from the reservoir by the application of the pressure of compressed air thereto, substantially as set forth.

14. The combination, with a railroad-car or other railroad-vehicle, of an axle carrying a loose disk adapted to bear against the inner faces of a line of track-rails, a spring acting to press said disk toward and against the track-rails, and a recording-pen actuated by a shaft which is coupled to said disk and is vibrated by the longitudinal movements thereof upon its axle, induced by lateral inequalities in the line of rails against which it bears, substantially as set forth.

15. The combination, with a railway-vehicle, of a pair of reservoirs or receptacles, adapted to contain a fluid medium, arranged at opposite sides of the vehicle and connected by a pipe, a pair of floats located within the reservoirs and coupled to an intermediate rock-shaft, and a recording-pen connected with said rock-shaft, so as to be actuated by the movements thereof produced by variation of level of the liquid in the reservoirs and the consequent movement of the floats, substantially as herein set forth.

16. The combination, with a railroad-car body, of a truck or carriage pivoted to the car-body independently of the supporting wheels or trucks thereof, and with the capacity of following curvatures in the track independently of said body and of its supporting-wheels, a shaft connected to said truck, so as to be turned about its center by the lateral movements thereof, and a recording-pen connected with and actuated by said shaft, so as to indicate the character and extent of the movements thereof, substantially as set forth.

17. The combination, with a railroad-car body, of a truck or carriage pivoted to the car-body independently of its supporting wheels or trucks, mechanism for actuating a recording-pen by the movements of said independent truck, and mechanism for raising and lowering said independent truck from and to the track-rails, substantially as set forth.

18. The combination, in an apparatus for recording results of investigation of traction-resistances and track-inspection on railroads, of a paper-carrying drum, a removable shaft on which the same is mounted, a locking device for connecting the drum and shaft, and a gear and adjustable friction-clutch for rotating the drum and shaft, these members being combined for joint operation to admit of the ready insertion and removal of webs of paper and the winding and unwinding thereof at such rates of speed as may be required relatively to that of the car on which the apparatus is located, substantially as set forth.

19. A graphical diagram or chart for the investigation of railroad operations, in which are combined a mechanically-formed graphical indication of the resistances to traction exerted in the traverse over any required length of road, a similarly-formed graphical indication of the divided periods of time within which said resistances are respectively exerted, and one or more similarly-formed graphical indications, each illustrating an element of the character or condition of track passed over tending to modify or affect the degree of resistance to traction, all of said indications being formed upon a determined scale and in fixed mutual relation at all points in their length, substantially as set forth.

20. The combination, with a railway-vehicle, of a frame having a table upon its top, a pair of paper-carrying drums having frictional connection with their driving-gears, and gearing driven from one of the vehicle-axles for rotating the drum-driving gears in opposite directions, two pairs of feed-rolls, either pair of which, as desired, may be driven coincidently with the drum-driving gears, these parts being combined for joint operation to effect the winding of the web of paper from one drum over the table to the other, and for preventing the wrinkling or slackness of such web, substantially as herein set forth.

21. The combination, with a railroad-car or other railroad-vehicle, of a frame supporting a table, a pair of feed-rollers and a paper-carrying drum, a shaft by which said feed-rollers and drum are rotated, and change wheel-gearing, through which motion is communicated to said shaft from one of the axles of the car, these members being combined for joint operation to admit of variation of the speed of traverse of the web of paper in accordance with the distance traversed by the car, substantially as set forth.

22. The combination, with a railroad-car or other railroad-vehicle, of a frame supporting a table, a pair of feed-rollers and a paper-carrying drum, a shaft by which said drum is rotated, driving-gearing communicating motion to said shaft from one of the axles of the car, and mechanism for reversing the direction of motion of said shaft in accordance with changes of direction of the movement of the car, substantially as set forth.

23. The combination, in an apparatus for recording results of investigation of resistances to traction upon railroads, of a cross head or block and a liquid-cylinder and piston through which such cross head or block is moved by resistances exerted upon the draw-bar of a railroad-car, a disk which receives rotation at a determined speed from an axle of said car, a roller which rests upon said disk, so as to be rotated at a greater or less speed proportionately to its distance from the center thereof, links connecting said roller with the cross head or block, an electro-magnetic recording-pen adapted to register the revolutions of said roller upon a web of paper, and a circuit-closer by which said pen is actuated at each revolution of the roller, these members being combined for joint operation, substantially as and for the purpose set forth.

24. The combination, in an apparatus for recording results of investigation of resistances to traction upon railroads, of a recording-pen actuated by mechanism adapted to determine the resistances exerted upon the draw-bar of a railroad-car, a clock or other time-piece, a circuit-closer actuated by the mechanism of said time-piece, and wires connecting said circuit-closer with an electro-magnetic recording-pen and a battery-cell, substantially as set forth.

25. The combination, in an apparatus for recording results of investigation of resistances to traction or track-inspection upon railroads, of a series of recording-pens connected to arms placed side by side, a series of electro-magnets located in pairs one behind the other in the direction of the pen-arms, with their cores extending beyond their heads, and a series of armatures connected to the pen-arms on opposite sides, respectively, of the members of each pair of electro-magnets, substantially as set forth.

26. The combination, with the frame or the truck of a railroad-car, of two supporting-wheels and their axles, a measuring wheel and axle fitted in bearings in said frame independently of said supporting-wheels, fixed guides and a vertically-movable box for the axle of said wheel, and a series of levers and shafts connecting the axle-box of said measuring-wheel with the arm of a recording-pen, these members being combined for joint operation, so that the recording-pen shall be actuated by vertical movements of the measuring-wheel and its box relatively to a plane defined by the contact of the two supporting-wheels with the rail, substantially as set forth.

27. The combination, with a railroad-car, of a measuring wheel and axle, a vertical shaft formed in sections, the lower of which is coupled by rock-shaft and link connections to the axle-box of the measuring-wheel, a recording-pen connected with the upper section of said vertical shaft, and a universal joint and longitudinally-sliding coupling connecting the sections of said shaft, these members being combined for joint operation to effect the actuation of the recording-pen independently of vertical or lateral movements of the car-body, substantially as set forth.

28. The combination, with a railroad-car, of a measuring wheel and axle, a rod or shaft adapted to partake of the vertical movements thereof and coupled to a pawl-lever journaled upon the shaft of a disk, and a frictional driving-pawl pivoted to the pawl-lever, its free end being pressed by a spring against the periphery of the disk at a point in advance of a line drawn from the center of the disk to the pivot of the pawl, these members being combined for joint operation to effect the intermittent rotation of the disk by and during the entire extent of the upward vertical movements of the measuring wheel and axle, substantially as set forth.

29. The combination, with a railroad car, of a measuring wheel and axle, a disk adapted to be rotated intermittently by the upward vertical movements of said wheel and axle, wires connecting said disk with a recording-pen and a battery-cell, and a circuit-closing attachment connected with the disk and serving to actuate the recording-pen at each revolution or determined fraction of a revolution thereof, substantially as set forth.

30. The combination, with a railway-vehicle, of a measuring wheel and axle, a disk secured to a shaft fitted to bearings in a case located on the frame or truck of the vehicle, a pawl-lever journaled upon the shaft of said disk, a connection for operating the pawl-lever from the movable box of the measuring-wheel, one or more frictional driving-pawls, each pivoted to the pawl-lever and having its free end pressed by a spring against the periphery of the disk at a point in advance of a line drawn from the center of the disk to the pivot of the pawl, and one or more retaining-pawls, each pivoted to the frame on which the disk rotates and having its free end pressed by a spring against the periphery of the disk, substantially as set forth.

31. The combination, with a railroad-car, of a measuring wheel and axle, a disk secured to a shaft fitted in bearings in a case located upon the frame or truck of the car, a pawl-lever journaled upon the shaft of said disk, a frictional driving-pawl pivoted to said lever, and a rod or shaft coupled by ball-joints to said lever and to the axle-box of the measuring-wheel, substantially as set forth.

32. The combination, with a railroad-car, of an axle carrying a loose disk adapted to bear against the inner faces of a line of track-rails, a spring acting to press said disk toward and against the track-rails, a pivoted lever adapted to be operated by a flexible connection from a point within the car and acting to move said disk in opposite direction to that induced by the tension of the spring, and a hoisting-shaft united by a flexible connection with the axle of the disk and acting to elevate the same from its working position relatively to the rails when required, substantially as set forth.

33. The combination, with a railroad-car body, of a truck or carriage pivoted to the car-body independently of the supporting wheels or trucks thereof, one or more vertical cylinders, each secured upon the frame of said truck and having a piston whose rod is provided with a block fitting in a guide-bar on the car-body, a compressed-air reservoir connected by pipes with said cylinder above and below its piston, and a cock or valve governing the supply and exhaust of compressed air to and from said cylinders, substantially as set forth.

34. The combination, with a railroad-car or other railroad-vehicle, of two axles, each carrying a wheel which by its contact with the track-rail serves as one of the longitudinal limits of a datum-plane, a measuring wheel and axle or a sliding contact-piece adapted to follow the vertical or surface inequalities of the track-rails independently of the datum-plane-limiting wheels, a bar or frame carried by the axles of said datum-plane-limiting wheels, a forcing-chamber having a piston or plunger and a discharge pipe and valve, and connected by a pipe with a pigment-reservoir, a valve-chest communicating with a compressed-air reservoir and connected by ports or passages with the forcing-chamber, a valve governing the supply of compressed air to the forcing-chamber, and a sliding rod and arm actuated by the vertical movements of the measuring-axle relatively to the bar or frame of the datum-plane-limiting wheels, and serving to operate the air-valve of the forcing-chamber, substantially as set forth.

35. The combination, with a railroad-car or other railroad-vehicle, of a compressed-air reservoir, a paint or pigment reservoir adapted to communicate intermittently therewith, a discharge-pipe communicating with said paint-reservoir, a discharge-valve governing the exit-opening of said discharge-pipe, and a spring which tends to maintain said valve in position to cover said opening, substantially as set forth.

36. The combination, with a railroad-car or other railroad-vehicle, of a compressed-air reservoir, a paint or pigment reservoir, a valve-chest, and a valve therein which governs the application of compressed air to the ejection of paint, a rod and arm serving to intermittently actuate said valve, and a frame connected to the axle-box of a measuring-wheel and acting to reciprocate the valve-operating rod and arm through the intermediation of a yielding connection, substantially as set forth.

37. The combination, with the main supporting-wheels of a railway vehicle or truck, of measuring-wheels arranged between such main supporting-wheels, equalizing-bars through which the weight of the car is distributed upon the boxes of all said wheels, the measuring-wheels receiving a portion of the weight, mechanism for producing the travel of a web of paper, and a marker connected with the movable boxes of the measuring-wheels and serving to graphically indicate on the web of paper the rising and falling movements of the measuring-wheels produced by irregularities in or deflections of the track-rails under the weight of the car, substantially as herein described.

38. The combination, with the main supporting-wheels of a railway-vehicle or a vehicle-truck, of measuring-wheels arranged between such main supporting-wheels, equalizing-bars through which the weight of the car is distributed upon the boxes of the main supporting-wheels and the measuring-wheels, the latter wheels receiving a portion of the weight, an apparatus upon the vehicle for ejecting marking-fluid upon the rails or other portion of the superstructure, a valve controlling the ejection of fluid from the apparatus, and connections between the vertically-movable boxes of the measuring-wheels and said valve, through which said valve is operated by the rising and falling movements of said measuring-wheels, substantially as herein described.

PLIMMON H. DUDLEY.

Witnesses:
J. SNOWDEN BELL,
I. P. CHAMBERS.